United States Patent
Morris

(10) Patent No.: US 11,145,215 B1
(45) Date of Patent: Oct. 12, 2021

(54) METHODS, SYSTEMS, AND COMPUTER PROGRAM PRODUCTS FOR PROVIDING FEEDBACK TO A USER OF A PORTABLE ELECTRONIC IN MOTION

(71) Applicant: SITTING MAN, LLC, Madison, GA (US)

(72) Inventor: Robert Paul Morris, Madison, GA (US)

(73) Assignee: Sitting Man, LLC, Madison, GA (US)

( * ) Notice: Subject to any disclaimer, the term of this patent is extended or adjusted under 35 U.S.C. 154(b) by 18 days.

(21) Appl. No.: 16/805,677

(22) Filed: Feb. 28, 2020

Related U.S. Application Data

(63) Continuation-in-part of application No. 16/574,026, filed on Sep. 17, 2019, which is a continuation of application No. 15/921,636, filed on Mar. 14, 2018, now abandoned, which is a continuation-in-part of application No. 15/595,906, filed on May 15, 2017, now abandoned, which is a continuation-in-part of application No. 14/195,832, filed on Mar. 3, 2014, now abandoned, which is a continuation-in-part of application No. 13/045,556, filed on Mar. 11, 2011, now abandoned.

(Continued)

(51) Int. Cl.
| | |
|---|---|
| *G01C 21/34* | (2006.01) |
| *G08G 9/02* | (2006.01) |
| *B60R 1/00* | (2006.01) |
| *H04N 7/18* | (2006.01) |
| *G08G 1/16* | (2006.01) |
| *G08G 1/0962* | (2006.01) |
| *H04N 5/232* | (2006.01) |
| *H04N 5/225* | (2006.01) |
| *H04N 5/33* | (2006.01) |

(52) U.S. Cl.
CPC ............... *G08G 9/02* (2013.01); *B60R 1/00* (2013.01); *G08G 1/0962* (2013.01); *G08G 1/165* (2013.01); *G08G 1/166* (2013.01); *H04N 5/23218* (2018.08); *H04N 5/23219* (2013.01); *H04N 5/232941* (2018.08); *H04N 7/183* (2013.01); *B60R 2300/8093* (2013.01); *H04N 5/2252* (2013.01); *H04N 5/33* (2013.01)

(58) Field of Classification Search
USPC ........................................................ 340/439
See application file for complete search history.

(56) References Cited

U.S. PATENT DOCUMENTS

| | | |
|---|---|---|
| 5,661,454 A | 8/1997 | Bezard et al. |
| 5,850,176 A | 12/1998 | Kinoshita et al. |

(Continued)

OTHER PUBLICATIONS

U.S. Appl. No. 13/045,556.

(Continued)

*Primary Examiner* — Brent Swarthout
(74) *Attorney, Agent, or Firm* — Patrick E. Caldwell, Esq.; The Caldwell Firm, LLC

(57) ABSTRACT

Methods and systems are described for detecting movement of a portable electronic device; receiving video data, for a first object, captured by a video capture device during the movement; and utilizing the video data, presenting a video by a display device of the portable electronic device that is viewable to a user for directing an attention of the user in connection with the first object.

22 Claims, 7 Drawing Sheets

Related U.S. Application Data

(60) Provisional application No. 62/642,581, filed on Mar. 13, 2018.

(56) References Cited

U.S. PATENT DOCUMENTS

| | | | |
|---|---|---|---|
| 6,100,796 A * | 8/2000 | Wagner | G01S 15/931 |
| | | | 340/435 |
| 6,326,915 B1 * | 12/2001 | Chen | G01S 13/867 |
| | | | 342/71 |
| 6,496,117 B2 | 12/2002 | Gutta et al. | |
| 6,724,538 B2 | 4/2004 | Kushida et al. | |
| 6,927,694 B1 | 8/2005 | Smith et al. | |
| 7,174,248 B2 | 2/2007 | Suzuki | |
| 7,260,458 B2 | 8/2007 | Kato et al. | |
| 7,289,019 B1 * | 10/2007 | Kertes | B60Q 9/008 |
| | | | 340/435 |
| 7,403,124 B2 | 7/2008 | Arakawa et al. | |
| 7,427,913 B2 | 9/2008 | Maron | |
| 7,528,731 B2 | 5/2009 | Zhang et al. | |
| 7,598,927 B2 | 10/2009 | Yamazaki et al. | |
| 7,705,738 B2 | 4/2010 | Fukaya et al. | |
| 7,710,243 B2 | 5/2010 | Akatsuka et al. | |
| 7,859,413 B2 | 12/2010 | Nguyen | |
| 8,953,841 B1 * | 2/2015 | Leblang | G06K 9/00671 |
| | | | 382/103 |
| 9,122,948 B1 * | 9/2015 | Zhu | G05D 1/0214 |
| 9,961,249 B2 * | 5/2018 | Joao | G01C 21/3679 |
| 2001/0056544 A1 | 12/2001 | Walker | |
| 2005/0255874 A1 | 11/2005 | Stewart-Baxter et al. | |
| 2006/0192660 A1 * | 8/2006 | Watanabe | B60R 1/00 |
| | | | 340/435 |
| 2007/0147660 A1 * | 6/2007 | Durucan | G08G 1/16 |
| | | | 382/104 |
| 2008/0080741 A1 | 4/2008 | Yokoo et al. | |
| 2008/0266552 A1 | 10/2008 | Malawey et al. | |
| 2009/0271002 A1 | 10/2009 | Asofsky | |
| 2010/0156617 A1 | 6/2010 | Nakada et al. | |
| 2010/0198491 A1 | 8/2010 | Mays | |
| 2012/0185165 A1 * | 7/2012 | Geelen | G01C 21/26 |
| | | | 701/436 |
| 2013/0029730 A1 * | 1/2013 | Harada | H04M 1/72522 |
| | | | 455/566 |
| 2014/0192181 A1 * | 7/2014 | Taylor | B60C 23/0408 |
| | | | 348/118 |
| 2016/0144785 A1 * | 5/2016 | Shimizu | B60R 11/02 |
| | | | 340/435 |
| 2017/0213435 A1 * | 7/2017 | Barth | G01S 13/867 |
| 2017/0337736 A1 * | 11/2017 | Cheng | G02B 27/017 |
| 2019/0071014 A1 * | 3/2019 | Misu | G06K 9/00805 |
| 2019/0087662 A1 * | 3/2019 | Zhao | H04N 7/188 |

OTHER PUBLICATIONS

U.S. Appl. No. 15/595,906.
U.S. Appl. No. 15/921,636.
U.S. Appl. No. 16/574,026.
U.S. Appl. No. 62/642,581.

* cited by examiner

METHODS, SYSTEMS, AND COMPUTER PROGRAM PRODUCTS FOR PROVIDING FEEDBACK TO A USER OF A PORTABLE ELECTRONIC IN MOTION

RELATED APPLICATIONS

This application is a continuation-in-part of U.S. patent application Ser. No. 16/574,026, filed Sep. 17, 2019, titled "METHODS, SYSTEMS, AND COMPUTER PROGRAM PRODUCTS FOR PROVIDING FEEDBACK TO A USER IN MOTION," is a continuation of U.S. patent application Ser. No. 15/921,636, filed Mar. 14, 2018, titled "METHODS, SYSTEMS, AND COMPUTER PROGRAM PRODUCTS FOR PROVIDING FEEDBACK TO A USER IN MOTION," (now abandoned) which is a continuation-in-part of U.S. patent application Ser. No. 15/595,906, filed May 15, 2017, titled "METHODS, SYSTEMS, AND COMPUTER PROGRAM PRODUCTS FOR PROVIDING FEEDBACK TO A USER IN MOTION," (now abandoned) which is a continuation of U.S. patent application Ser. No. 14/195,832, filed Mar. 3, 2014, titled "METHODS, SYSTEMS, AND COMPUTER PROGRAM PRODUCTS FOR PROVIDING STEERING-CONTROL FEEDBACK TO AN OPERATOR OF AN AUTOMOTIVE VEHICLE," (now abandoned) which is a continuation of U.S. patent application Ser. No. 13/045,556, filed on Mar. 11, 2011, titled "METHODS, SYSTEMS, AND COMPUTER PROGRAM PRODUCTS FOR PROVIDING FEEDBACK TO A USER OF A PORTABLE ELECTRONIC DEVICE IN MOTION" (now abandoned).

INCORPORATED APPLICATIONS

U.S. patent application Ser. No. 13/045,556, filed on Mar. 11, 2011, titled "METHODS, SYSTEMS, AND COMPUTER PROGRAM PRODUCTS FOR PROVIDING FEEDBACK TO A USER OF A PORTABLE ELECTRONIC DEVICE IN MOTION (now abandoned) is incorporated by reference in its entirety for all purposes.

Still yet, the entire disclosures of the following applications are incorporated by reference herein for all purposes:

Application Ser. No. 13/023,883 (US 2012-0200406 A1) filed on 2011 Feb. 9, entitled "Methods, Systems, and Program Products for Directing Attention of an Occupant of an Automotive Vehicle to a Viewport" (now abandoned);

Application Ser. No. 13/023,916 (US 2012-0200403 A1) filed on 2011 Feb. 9, entitled "Methods, Systems, and Program Products for Directing Attention to a Sequence of Viewports of an Automotive Vehicle" (now abandoned);

Application Ser. No. 13/025,939 (US 2012-0209474 A1) filed on 2011 Feb. 11, entitled "Methods, Systems, and Program Products for Providing Steering-Control Feedback to an Operator of an Automotive Vehicle" (now U.S. Pat. No. 8,666,603);

Application Ser. No. 13/025,944 (US 2012-0206268 A1) filed on 2011 Feb. 11, entitled "Methods, Systems, and Program Products for Managing Attention of a User of a Portable Electronic Device" (now abandoned);

Application Ser. No. 13/024,444 (US 2012-0206254 A1) filed on 2011 Feb. 10, entitled "Methods, Systems, and Program Products for Managing Operation of a Portable Electronic Device" (now U.S. Pat. No. 8,902,054);

Application Ser. No. 13/023,932 (US 2012-0200404 A1) filed on 2011 Feb. 9, entitled "Methods, Systems, and Program Products for Altering Attention of an Automotive Vehicle Operator" (now abandoned);

Application Ser. No. 13/023,952 (US 2012-0200407 A1) filed on 2011 Feb. 9, entitled "Methods, Systems, and Program Products for Managing Attention of an Operator of an Automotive Vehicle" (now abandoned); and Application Ser. No. 13/024,466 (US 2012-0206255 A1) filed on 2011 Feb. 10, entitled "Methods, Systems, and Program Products for Managing Operation of an Automotive Vehicle" (now U.S. Pat. No. 8,773,251).

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods and systems are described for detecting movement of a portable electronic device; receiving video data, for a first object, captured by a video capture device during the movement; and utilizing the video data, presenting a video by a display device of the portable electronic device that is viewable to a user for directing an attention of the user in connection with the first object.

BRIEF DESCRIPTION OF THE DRAWINGS

Objects and advantages of the present invention will become apparent to those skilled in the art upon reading this description in conjunction with the accompanying drawings, in which like reference numerals have been used to designate like or analogous elements, and in which.

DETAILED DESCRIPTION

Figure 1:
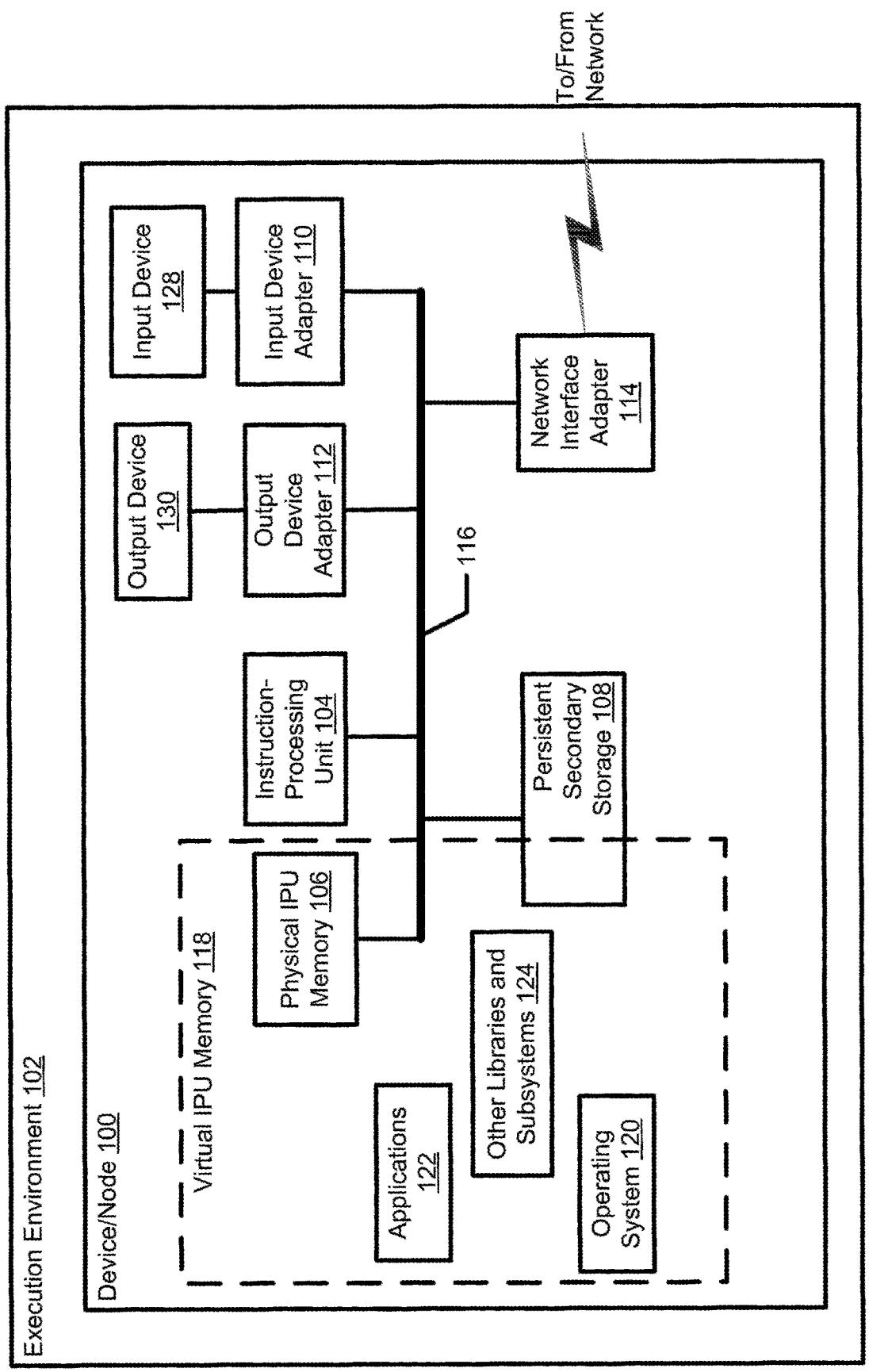
FIG. 1 is a block diagram illustrating an exemplary hardware device included in and/or otherwise providing an execution environment in which the subject matter may be implemented.

One or more aspects of the disclosure are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of the disclosure. It may be evident, however, to one skilled in the art, that one or more aspects of the disclosure may be practiced with a lesser degree of these specific details. In other instances, well-known structures and devices are shown in block diagram form in order to facilitate describing one or more aspects of the disclosure.

An exemplary device included in an execution environment that may be configured according to the subject matter is illustrated in FIG. 1. An execution environment includes an arrangement of hardware and, in some aspects, software that may be further configured to include an arrangement of components for performing a method of the subject matter described herein. An execution environment includes and/or is otherwise provided by one or more devices. An execution environment may include a virtual execution environment including software components operating in a host execution environment. Exemplary devices included in and/or otherwise providing suitable execution environments for configuring according to the subject matter include personal computers, notebook computers, tablet computers, servers, portable electronic devices, handheld electronic devices, mobile devices, multiprocessor devices, distributed systems, consumer electronic devices, communication servers, and/or any other suitable devices. Those skilled in the art will understand that the components illustrated in FIG. 1 are exemplary and may vary by particular execution environment.

FIG. 1 illustrates hardware device 100 included in execution environment 102. FIG. 1 illustrates that execution environment 102 includes instruction-processing unit (IPU) 104, such as one or more microprocessors; physical IPU memory 106 including storage locations identified by addresses in a physical memory address space of IPU 104; persistent secondary storage 108, such as one or more hard drives and/or flash storage media; input device adapter 110, such as a key or keypad hardware, a keyboard adapter, and/or a mouse adapter; output device adapter 112, such as a display and/or an audio adapter for presenting information to a user; a network interface component, illustrated by network interface adapter 114, for communicating via a network such as a LAN and/or WAN; and a communication mechanism that couples elements 104-114, illustrated as bus 116. Elements 104-114 may be operatively coupled by various means. Bus 116 may comprise any type of bus architecture, including a memory bus, a peripheral bus, a local bus, and/or a switching fabric.

IPU 104 is an instruction execution machine, apparatus, or device. Exemplary IPUs include one or more microprocessors, digital signal processors (DSPs), graphics processing units, application-specific integrated circuits (ASICs), and/or field programmable gate arrays (FPGAs). In the description of the subject matter herein, the terms "IPU" and "processor" are used interchangeably. IPU 104 may access machine code instructions and data via one or more memory address spaces in addition to the physical memory address space. A memory address space includes addresses identifying locations in a processor memory. The addresses in a memory address space are included in defining a processor memory. IPU 104 may have more than one processor memory. Thus, IPU 104 may have more than one memory address space. IPU 104 may access a location in a processor memory by processing an address identifying the location. The processed address may be identified by an operand of a machine code instruction and/or may be identified by a register or other portion of IPU 104.

FIG. 1 illustrates virtual IPU memory 118 spanning at least part of physical IPU memory 106 and may span at least part of persistent secondary storage 108. Virtual memory addresses in a memory address space may be mapped to physical memory addresses identifying locations in physical IPU memory 106 and/or in persistent secondary storage 108. An address space for identifying locations in a virtual processor memory is referred to as a virtual memory address space; its addresses are referred to as virtual memory addresses; and its IPU memory is referred to as a virtual IPU memory or virtual memory. The terms "IPU memory" and "processor memory" are used interchangeably herein. Processor memory may refer to physical processor memory, such as IPU memory 106, and/or may refer to virtual processor memory, such as virtual IPU memory 118, depending on the context in which the term is used.

Physical IPU memory 106 may include various types of memory technologies. Exemplary memory technologies include static random access memory (SRAM) and/or dynamic RAM (DRAM) including variants such as dual data rate synchronous DRAM (DDR SDRAM), error correcting code synchronous DRAM (ECC SDRAM), RAMBUS DRAM (RDRAM), and/or XDR™ DRAM. Physical IPU memory 106 may include volatile memory as illustrated in the previous sentence and/or may include nonvolatile memory such as nonvolatile flash RAM (NVRAM) and/or ROM.

Persistent secondary storage 108 may include one or more flash memory storage devices, one or more hard disk drives, one or more magnetic disk drives, and/or one or more optical disk drives. Persistent secondary storage may include a removable medium. The drives and their associated computer-readable storage media provide volatile and/or nonvolatile storage for computer-readable instructions, data structures, program components, and other data for execution environment 102.

Execution environment 102 may include software components stored in persistent secondary storage 108, in remote storage accessible via a network, and/or in a processor memory. FIG. 1 illustrates execution environment 102 including operating system 120, one or more applications 122, and other program code and/or data components illustrated by other libraries and subsystems 124. In an aspect, some or all software components may be stored in locations accessible to IPU 104 in a shared memory address space shared by the software components. The software components accessed via the shared memory address space are stored in a shared processor memory defined by the shared memory address space. In another aspect, a first software component may be stored in one or more locations accessed by IPU 104 in a first address space and a second software component may be stored in one or more locations accessed by IPU 104 in a second address space. The first software component is stored in a first processor memory defined by the first address space and the second software component is stored in a second processor memory defined by the second address space.

Software components typically include instructions executed by IPU 104 in a computing context referred to as a "process". A process may include one or more "threads". A "thread" includes a sequence of instructions executed by IPU 104 in a computing sub-context of a process. The terms "thread" and "process" may be used interchangeably herein when a process includes only one thread.

Execution environment 102 may receive user-provided information via one or more input devices illustrated by input device 128. Input device 128 provides input information to other components in execution environment 102 via input device adapter 110. Execution environment 102 may include an input device adapter for a keyboard, a touch screen, a microphone, a joystick, a television receiver, a video camera, a still camera, a document scanner, a fax, a phone, a modem, a network interface adapter, and/or a pointing device, to name a few exemplary input devices.

Input device 128 included in execution environment 102 may be included in device 100 as FIG. 1 illustrates or may be external (not shown) to device 100. Execution environment 102 may include one or more internal and/or external input devices. External input devices may be connected to device 100 via corresponding communication interfaces such as a serial port, a parallel port, and/or a universal serial bus (USB) port. Input device adapter 110 receives input and provides a representation to bus 116 to be received by IPU 104, physical IPU memory 106, and/or other components included in execution environment 102.

Output device 130 in FIG. 1 exemplifies one or more output devices that may be included in and/or that may be external to and operatively coupled to device 100. For example, output device 130 is illustrated connected to bus 116 via output device adapter 112. Output device 130 may be a display device. Exemplary display devices include liquid crystal displays (LCDs), light emitting diode (LED) displays, and projectors. Output device 130 presents output of execution environment 102 to one or more users. In some embodiments, an input device may also include an output device. Examples include a phone, a joystick, and/or a touch screen. In addition to various types of display devices, exemplary output devices include printers, speakers, tactile output devices such as motion-producing devices, and other output devices producing sensory information detectable by a user. Sensory information detected by a user is referred herein to as "sensory input" with respect to the user.

A device included in and/or otherwise providing an execution environment may operate in a networked environment communicating with one or more devices via one or more network interface components. The terms "communication interface component" and "network interface component" (NIC) are used interchangeably herein. FIG. 1 illustrates network interface adapter (NIA) 114 as a network interface component included in execution environment 102 to operatively couple device 100 to a network. A network interface component includes a network interface hardware (NIH) component and optionally a software component.

Exemplary network interface components include network interface controller components, network interface cards, network interface adapters, and line cards. A node may include one or more network interface components to interoperate with a wired network and/or a wireless network. Exemplary wireless networks include a BLUETOOTH network, a wireless 802.11 network, and/or a wireless telephony network (e.g., a cellular, PCS, CDMA, and/or GSM network). Exemplary network interface components for wired networks include Ethernet adapters, Token-ring adapters, FDDI adapters, asynchronous transfer mode (ATM) adapters, and modems of various types. Exemplary wired and/or wireless networks include various types of LANs, WANs, and/or personal area networks (PANs). Exemplary networks also include intranets and internets such as the Internet.

The terms "network node" and "node" in this document both refer to a device having a network interface component for operatively coupling the device to a network. Further, the terms "device" and "node" used herein refer to one or more devices and nodes, respectively, providing and/or otherwise included in an execution environment unless clearly indicated otherwise.

The user-detectable outputs of a user interface are generically referred to herein as "user interface elements". More specifically, visual outputs of a user interface are referred to herein as "visual interface elements". A visual interface element may be a visual output of a graphical user interface (GUI). Exemplary visual interface elements include windows, textboxes, sliders, list boxes, drop-down lists, spinners, various types of menus, toolbars, ribbons, combo boxes, tree views, grid views, navigation tabs, scrollbars, labels, tooltips, text in various fonts, balloons, dialog boxes, and various types of button controls including check boxes and radio buttons. An application interface may include one or more of the elements listed. Those skilled in the art will understand that this list is not exhaustive. The terms "visual representation", "visual output", and "visual interface element" are used interchangeably in this document. Other types of user interface elements include audio outputs referred to as "audio interface elements", tactile outputs referred to as "tactile interface elements", and the like.

A visual output may be presented in a two-dimensional presentation where a location may be defined in a two-dimensional space having a vertical dimension and a horizontal dimension. A location in a horizontal dimension may be referenced according to an X-axis and a location in a vertical dimension may be referenced according to a Y-axis. In another aspect, a visual output may be presented in a three-dimensional presentation where a location may be defined in a three-dimensional space having a depth dimension in addition to a vertical dimension and a horizontal dimension. A location in a depth dimension may be identified according to a Z-axis. A visual output in a two-dimensional presentation may be presented as if a depth dimension existed allowing the visual output to overlie and/or underlie some or all of another visual output.

An order of visual outputs in a depth dimension is herein referred to as a "Z-order". The term "Z-value" as used herein refers to a location in a Z-order. A Z-order specifies the front-to-back and/or back-to-front ordering of visual outputs in a presentation space with respect to a Z-axis. In one aspect, a visual output with a higher Z-value than another visual output may be defined to be on top of or closer to the front than the other visual output.

A "user interface (UI) element handler" component, as the term is used in this document, includes a component configured to send information representing a program entity for presenting a user-detectable representation of the program entity by an output device, such as a display. A "program entity" is an object included in and/or otherwise processed by an application or executable. The user-detectable representation is presented based on the sent information. Information that represents a program entity for presenting a user detectable representation of the program entity by an output device is referred to herein as "presentation information". Presentation information may include and/or may otherwise identify data in one or more formats. Exemplary formats include image formats such as JPEG, video formats such as MP4, markup language data such as hypertext markup language (HTML) and other XML-based markup, a bit map, and/or instructions such as those defined by various script languages, byte code, and/or machine code. For example, a web page received by a browser from a remote application provider may include HTML, ECMAScript, and/or byte code for presenting one or more user interface elements included in a user interface of the remote application. Components configured to send information representing one or more program entities for presenting particular types of output by particular types of output devices include visual interface element handler components, audio interface element handler components, tactile interface element handler components, and the like.

A representation of a program entity may be stored and/or otherwise maintained in a presentation space. As used in this document, the term "presentation space" refers to a storage region allocated and/or otherwise provided for storing presentation information, which may include audio, visual, tactile, and/or other sensory data for presentation by and/or on an output device. For example, a buffer for storing an image and/or text string may be a presentation space as sensory information for a user. A presentation space may be physically and/or logically contiguous or non-contiguous. A presentation space may have a virtual as well as a physical representation. A presentation space may include a storage location in a processor memory, secondary storage, a memory of an output adapter device, and/or a storage medium of an output device. A screen of a display, for example, is a presentation space.

As used herein, the terms "program" and "executable" refer to data representations that may be translated into a set of machine code instructions and optionally into associated program data. Thus, a program or executable may include an application, a shared or non-shared library, and/or a system command. Program representations other than machine code include object code, byte code, and source code. Object code includes a set of instructions and/or data elements that either are prepared for linking prior to loading or are loaded into an execution environment. When in an execution environment, object code may include references resolved by a linker and/or may include one or more unresolved references. The context in which this term is used will make clear the state of the object code when it is relevant. This definition can include machine code and virtual machine code, such as Java™ byte code.

As used herein, an "addressable entity" is a portion of a program, specifiable in programming language in source code. An addressable entity is addressable in a program component translated for a compatible execution environment from the source code. Examples of addressable entities include variables, constants, functions, subroutines, procedures, modules, methods, classes, objects, code blocks, and labeled instructions. A code block includes one or more instructions in a given scope specified in a programming language. An addressable entity may include a value. In some places in this document "addressable entity" refers to a value of an addressable entity. In these cases, the context will clearly indicate that the value is being referenced.

Addressable entities may be written in and/or translated to a number of different programming languages and/or representation languages, respectively. An addressable entity may be specified in and/or translated into source code, object code, machine code, byte code, and/or any intermediate languages for processing by an interpreter, compiler, linker, loader, and/or other analogous tool.

Figure 2:
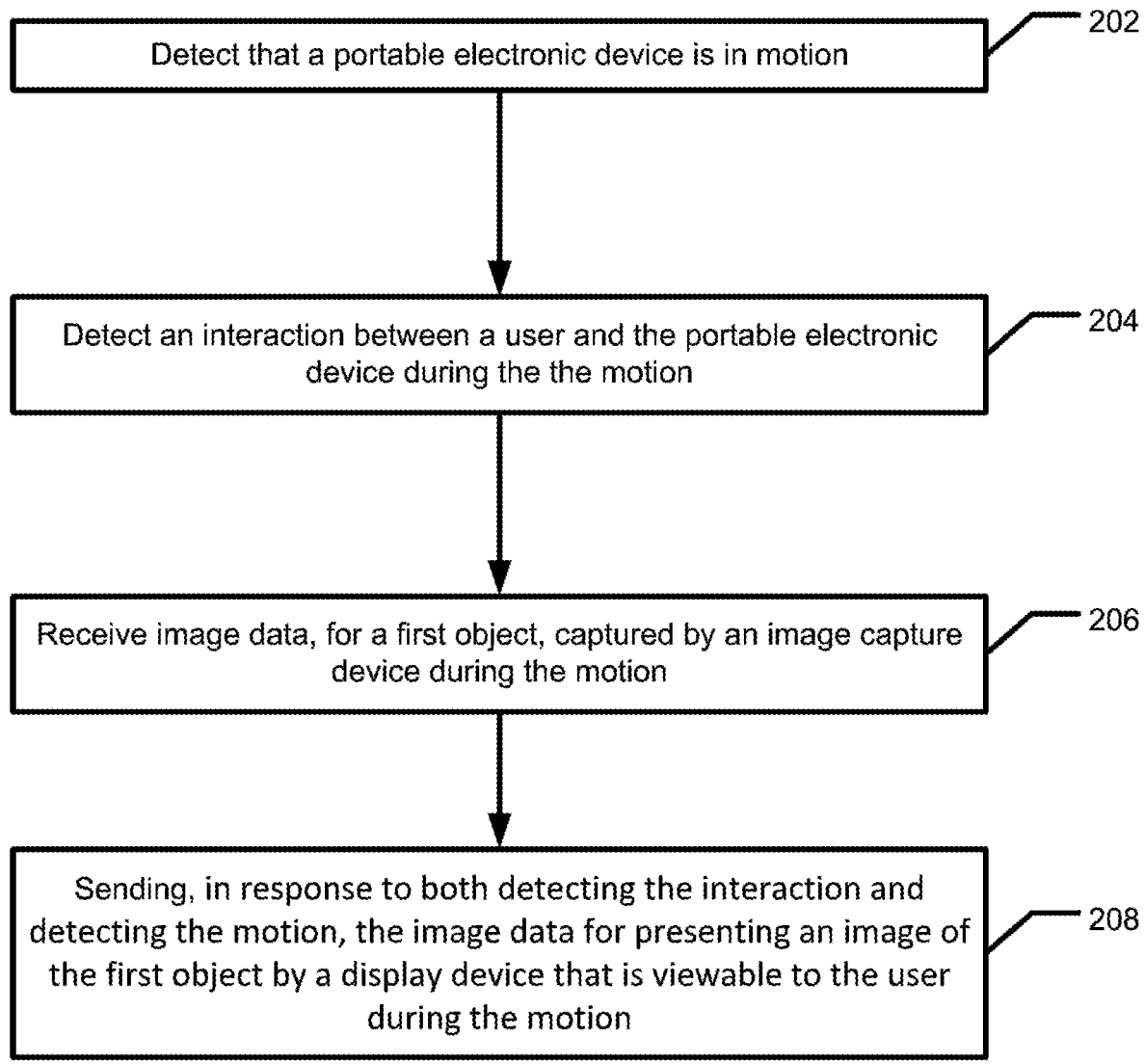
FIG. 2 is a flow diagram illustrating a method for providing feedback to a user of a portable electronic device in motion according to an aspect of the subject matter described herein.
Figure 3:
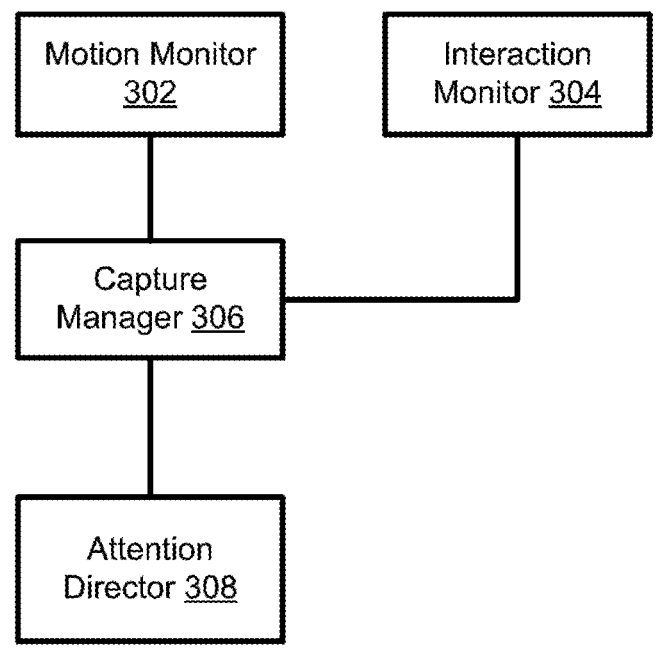
FIG. 3 is a block diagram illustrating an arrangement of components for providing feedback to a user of a portable electronic device in motion according to another aspect of the subject matter described herein.
Figure 4A:
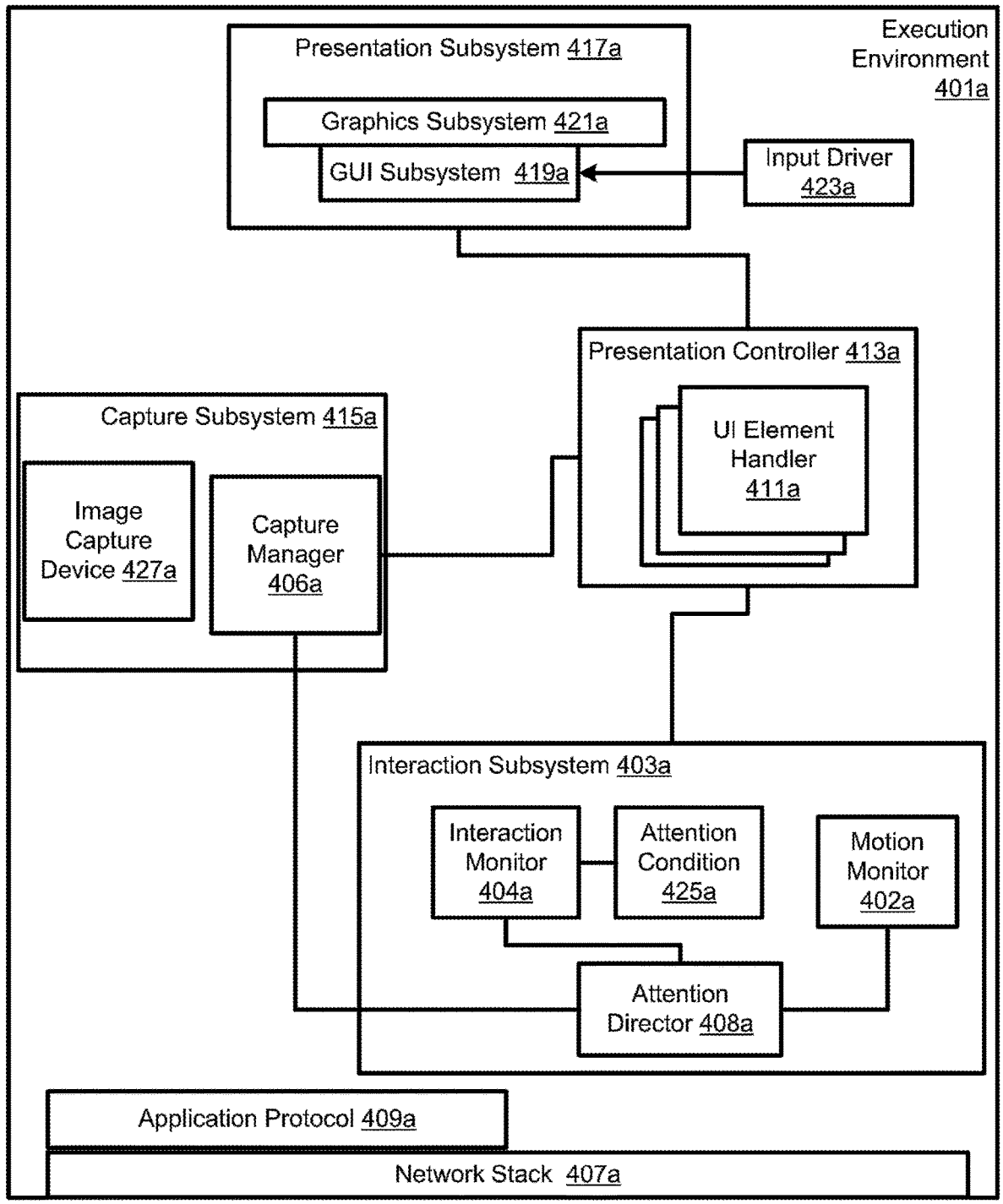
FIG. 4a is a block diagram illustrating an arrangement of components for providing feedback to a user of a portable electronic device in motion according to another aspect of the subject matter described herein.
Figure 4B:
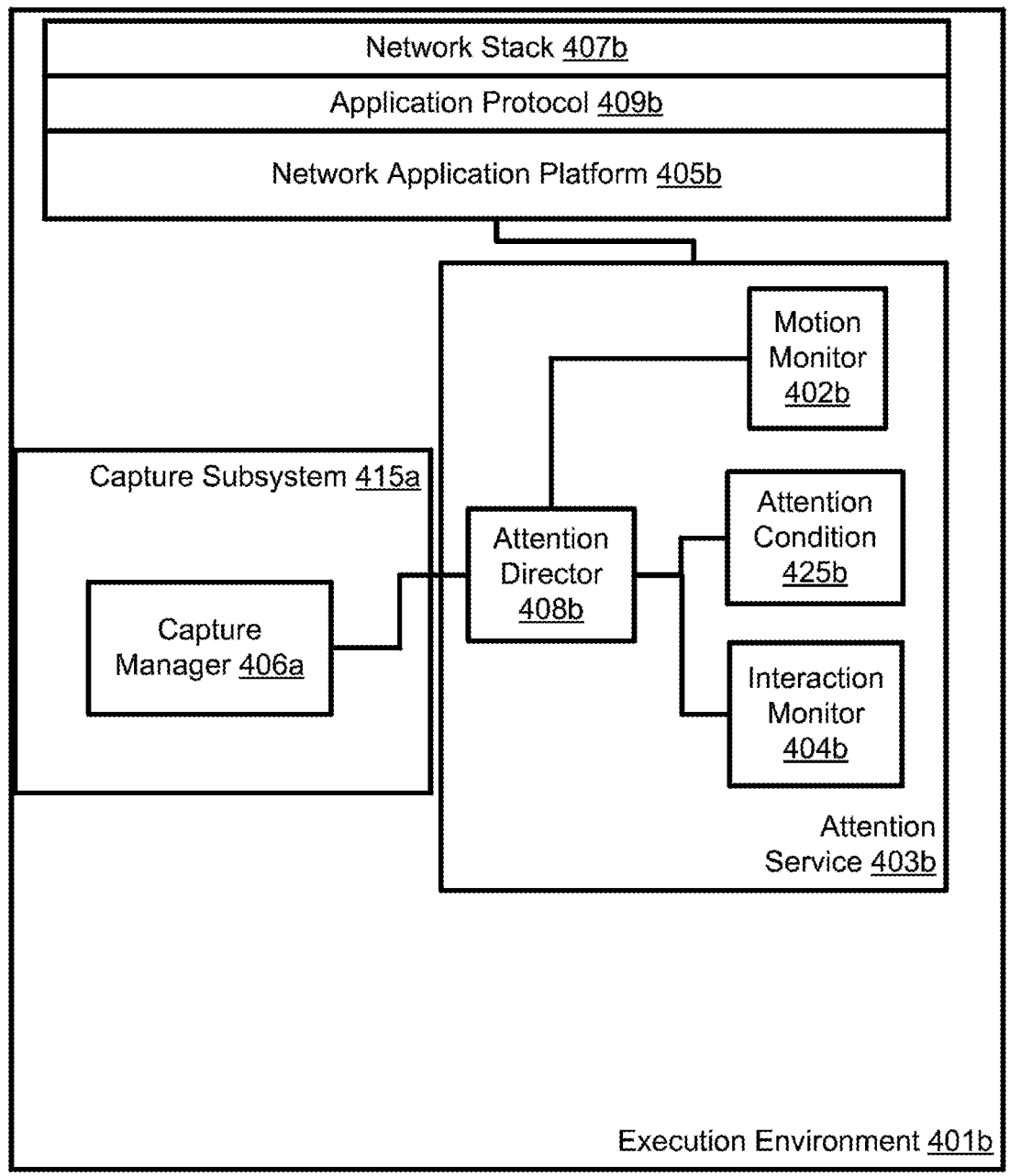
FIG. 4b is a block diagram illustrating an arrangement of components for providing feedback to a user of a portable electronic device in motion according to another aspect of the subject matter described herein.

The block diagram in FIG. 3 illustrates an exemplary system for providing feedback to a user of a portable electronic device in motion according to the method illustrated in FIG. 2. FIG. 3 illustrates a system, adapted for operation in an execution environment, such as execution environment 102 in FIG. 1, for performing the method illustrated in FIG. 2. The system illustrated includes a motion monitor component 302, an interaction monitor component 304, a capture manager component 306, and an attention director component 308. The execution environment includes an instruction-processing unit, such as IPU 104, for processing an instruction in at least one of the motion monitor component 302, the interaction monitor component 304, the capture manager component 306, and the attention director component 308. Some or all of the exemplary components illustrated in FIG. 3 may be adapted for performing the method illustrated in FIG. 2 in a number of execution environments. FIG. 4a and FIG. 4b are each block diagrams illustrating the components of FIG. 3 and/or analogs of the components of FIG. 3 respectively adapted for operation in execution environment 401a and in execution environment 401b that include and/or that otherwise are provided by one or more nodes. Components, illustrated in FIG. 4a and FIG. 4b, are identified by numbers with an alphabetic character postfix. Execution environments; such as execution environment 401a, execution environment 401b, and their adaptations and analogs; are referred to herein generically as execution environment 401 or execution environments 401 when describing more than one. Other components identified with a postfix including an alphabetic character may be referred to generically or as a group in a similar manner.

FIG. 1 illustrates key components of an exemplary device that may at least partially provide and/or otherwise be included in an execution environment. The components illustrated in FIG. 4a and FIG. 4b may be included in or otherwise combined with the components of FIG. 1 to create a variety of arrangements of components according to the subject matter described herein.

FIG. 4a illustrates execution environment 401a including an adaptation of the arrangement of components in FIG. 3. Some or all of the components in the arrangement may be installed persistently in execution environment 401a or may be retrieved as needed via a network. In an aspect, some or all of the arrangement of components may be received from attention service 403b operating in execution environment 401b illustrated in FIG. 4b. Various adaptations of the arrangement in FIG. 3 may operate at least partially in execution environment 401a and at least partially in execution environment 401b. FIG. 4b illustrates execution environment 401b configured to host a remote application provider illustrated by attention service 403b. Attention service 403b includes another adaptation or analog of the arrangement of components in FIG. 3.

As stated the various adaptations of the arrangement in FIG. 3 are not exhaustive. For example, those skilled in the art will see, based on the description herein, that arrangements of components for performing the method illustrated in FIG. 2 may operate in a single device, or may be distributed across more than one node in a network and/or more than one execution environment.

Figure 5:
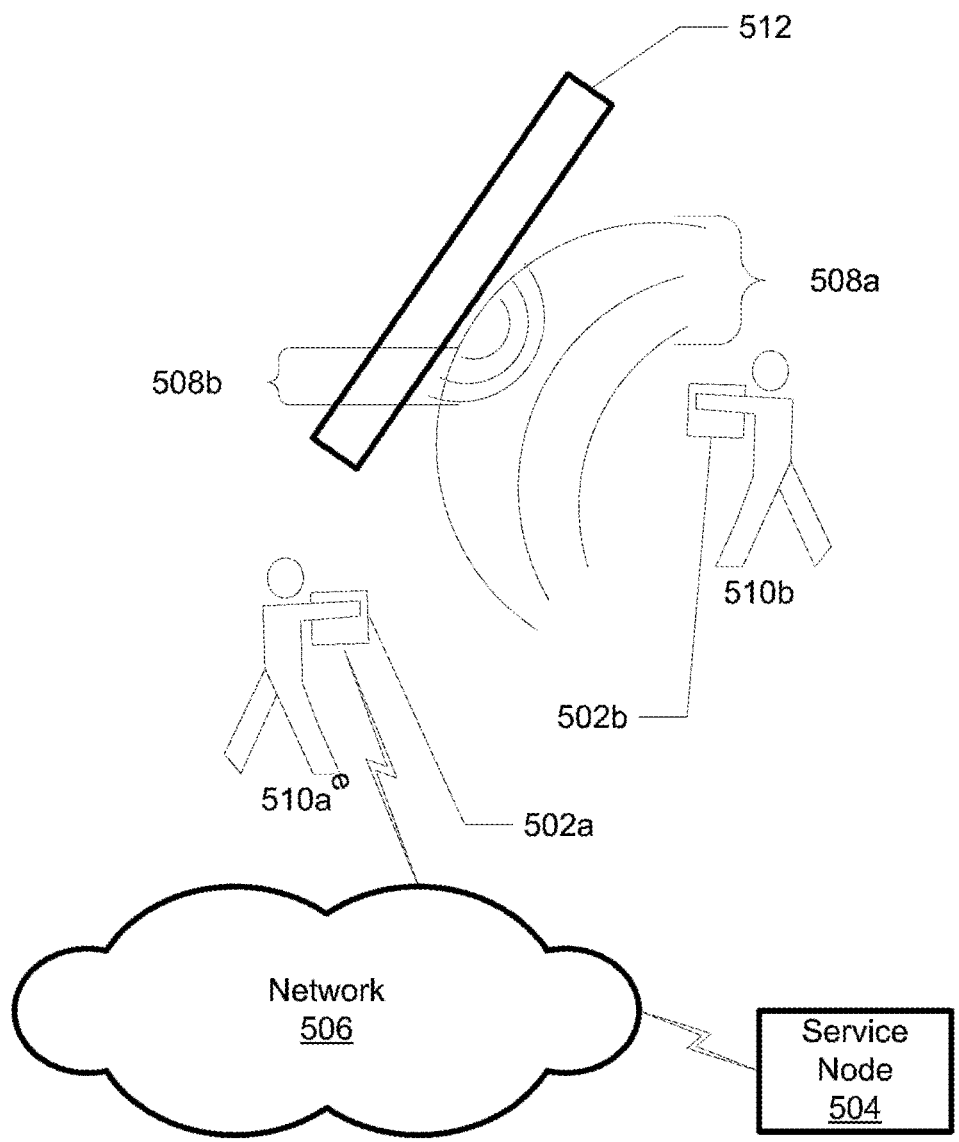
FIG. 5 is a illustrating a portable electronic device, in motion, operating for providing feedback to a user of a portable electronic device in motion according to another aspect of the subject matter described herein.

FIG. 5 illustrates portable electronic devices (PED) 502. Exemplary portable electronic devices include notebook computers, netbook computers, tablet computers, mobile phones, smart phones, media players, media capture devices, and game players, to name a few examples. Execution environment 401a in FIG. 4a may be adapted to include and/or otherwise be provided by a PED 502 in FIG. 5. A PED 502 may communicate with one or more application providers, such as network application platform 405b operating in execution environment 401b. Execution environment 401b may include and/or otherwise be provided by service node 504 in FIG. 5. A PED 502 and service node 504 may respectively include network interface components operatively coupling the respective nodes to network 506.

FIGS. 4*a*-*b* illustrate network stacks 407 configured for sending and receiving data over network 506, such as the Internet. Network application platform 405*b* in FIG. 4*b* may provide one or more services to attention service 403*b*. For example, network application platform 405*b* may include and/or otherwise provide web server functionally on behalf of attention service 403*b*. FIG. 4*b* also illustrates network application platform 405*b* configured for interoperating with network stack 407*b* providing network services for attention service 403*b*. Network stack 407*a* FIG. 4*a* serves a role analogous to network stack 407*b*.

Network stack 407*a* and network stack 407*b* may support the same protocol suite, such as TCP/IP, or may communicate via a network gateway (not shown) or other protocol translation device (not shown) and/or service. For example, a PED 502 and service node 504 in FIG. 5 may interoperate via their respective network stacks: network stack 407*a* in FIG. 4*a* and network stack 407*b* in FIG. 4*b*.

FIG. 4*a* illustrates an interaction subsystem 403*a*; and FIG. 4*b* illustrates attention service 403*b*, respectively, which may communicate via one or more application protocols. FIGS. 4*a*-*b* illustrates application protocol components 409 configured to communicate via one or more application protocols. Exemplary application protocols include a hypertext transfer protocol (HTTP), a remote procedure call (RPC) protocol, an instant messaging protocol, and a presence protocol. Application protocol components 409 in FIGS. 4*a*-*b* may support compatible application protocols. Matching protocols enable an interaction subsystem 403*a* supported by a PED 502 to communicate with attention service 403*b* of service node 504 via network 506 in FIG. 5. Matching protocols are not required if communication is via a protocol gateway or other protocol translator.

In FIG. 4*a*, interaction subsystem 403*a* may receive some or all of the arrangement of components, in FIG. 4*a*, in one or more messages received via network 506 from another node. The one or more message may be sent by attention service 403*b* via network application platform 405*b*, network stack 407*b*, a network interface component, and/or application protocol component 409*b* in execution environment 401*b*. Interaction subsystem 403*a* may interoperate via one or more application protocols supported by application protocol component 409*a* and/or via a protocol supported by network stack 407*a* to receive the message or messages including some or all of the components and/or their analogs adapted for operation in execution environment 401*a*.

UI element handler components 411*a* are illustrated in presentation controller component 413*a* in FIG. 4*a*. UI element handler components 411 and presentation controller components 413 are not shown in FIG. 4*b*, but those skilled in the art will understand upon reading the description herein that adaptations and/or analogs of some or all of these components configured to perform analogous operations may be adapted for operating in execution environment 401*b*. A presentation controller component 413 may manage the visual, audio, and/or other types of output of an application or executable. FIG. 4*a* illustrates presentation controller component 413*a* including one or more UI element handler components 411*a* for managing one or more types of output for interaction subsystem 403*a* and for capture subsystem 415*a*. A presentation controller component and/or a UI element handler component may be configured to receive and route detected user and other inputs to components and extensions of its including and/or otherwise controlling application or executable.

A UI element handler component 411 in various aspects may be adapted to operate at least partially in a content handler component (not shown) such as a text/html content handler component and/or a script content handler component. One or more content handlers may operate in an application such as a web browser. Additionally or alternatively, a UI element handler component 411 in an execution environment 401 may operate in and/or as an extension of its including application or executable. For example, a plug-in may provide a virtual machine, for a UI element handler component received as a script and/or byte code. The extension may operate in a thread and/or process of an application and/or may operate external to and interoperating with an application.

FIG. 4*a* illustrates interaction subsystem 403*a* operatively coupled to presentation controller component 413*a* and one or more UI element handlers 411*a* included in presentation controller component 413*a*. Various UI elements of interaction subsystem 403*a* may be presented by one or more UI element handler components 411*a*. Applications and/or other types of executable components that may operate in execution environment 401*a* may also include UI element handler components and/or otherwise interoperate with UI element handler components for presenting user interface elements via one or more output devices.

An execution environment may include a presentation subsystem for presenting one or more types of UI elements. FIG. 4*a* illustrates presentation subsystem 417*a* including components for presenting visual outputs. Other types of output may be presented in addition to or instead of visual output, in some aspects. Presentation subsystem 417*a* in FIG. 4*a* includes GUI subsystem 419*a*. GUI subsystem 419*a* may present UI elements by instructing corresponding graphics subsystem 421*a* to draw a UI interface element in a region of a presentation space, based on presentation information received from a corresponding UI element handler component 411*a*. Graphics subsystem 421*a* and a GUI subsystem 419*a* may be included in presentation subsystem 417*a*, as illustrated, which may include one or more output devices and/or may otherwise be operatively coupled to one or more output devices.

Input may be received and/or otherwise detected via one or more input drivers illustrated by input driver 423*a* in FIG. 4*a*. An input may correspond to a UI element presented via an output device. For example, a user may manipulate a pointing device, such as touch screen, for a pointer presented in a display presentation space over a user interface element, representing a selectable operation. A user may provide an input detected by input driver 423*a*. The detected input may be received by a GUI subsystem 419*a* via the input driver 423*a* as an operation or command indicator based on the association of the shared location of the pointer and the operation user interface element. In an aspect, input driver 423*a* may receive information for a detected input and may provide information based on the input without presentation subsystem 417*a* operating as an intermediary. One or more components in interaction subsystem 403*a* may receive information in response to an input detected by input driver 423*a*.

An "interaction", as the term is used herein, refers to any activity including a user and an object where the object is a source of sensory data detected by the user. In an interaction the user directs attention to the object. An interaction may also include the object as a target of input from the user. The input from the user may be provided intentionally or unintentionally. For example, a rock being held in the hand of a user is a target of input, both tactile and energy input, from the user. A portable electronic device is a type of object. In another example, a user looking at a portable electronic device is receiving sensory data from the portable electronic device whether the device is presenting an output via an output device or not. The user manipulating an input component of the portable electronic device illustrates a device, as an input target, receiving input from the user. Note that the user in providing input is detecting sensory information from the portable electronic device provided that the user directs sufficient attention to be aware of the sensory information and provided that no disabilities prevent the user from processing the sensory information. An interaction may include an input from the user that is detected and/or otherwise sensed by the device. An interaction may include sensory information, that is detected by a user included in the interaction, that is presented by an output device included in the interaction.

As used herein "interaction information" refers to any information that identifies an interaction and/or otherwise provides data about an interaction between a user and an object, such as a portable electronic device. Exemplary interaction information may identify a user input for the object, a user-detectable output presented by an output device of the object, a user-detectable attribute of the object, an operation performed by the object in response to a user, an operation performed by the object to present and/or otherwise produce a user-detectable output, and/or a measure of interaction. The term "operational component" of a device, as used herein, refers to a component included in performing an operation by the device.

Interaction information for one object may include and/or otherwise identify interaction information for another object. For example, a motion monitor may detect user's head turn in the direction of a display of a portable electronic device. Interaction information identifying the user's head is facing the display may be received and/or used as interaction information for the portable electronic device indicating the user is receiving visual input from the display. The interaction information may serve to indicate a lack of user interaction with one or more other objects in directions from the user different than the detected direction, such as a person approaching the user from behind the user. Thus the interaction information may serve as interaction information for one or more different objects.

The term "attention information" as used herein refers to information that identifies an attention output and/or that includes an indication to present an attention output. Attention information may identify and/or may include presentation information that includes a representation of an attention output, in one aspect. In another aspect, attention information may include a request and/or one or more instructions for processing by an IPU to present an attention output. The aspects described serve merely as examples based on the definition of attention information, and do not provide an exhaustive list of suitable forms and content of attention information.

As used herein the term "attention criterion" refers to a criterion that when met is defined as indicating that interaction between a user and an object is inadequate at a particular time and/or during a particular time period. In other words, the user is not directing adequate attention to the object.

With reference to FIG. 2, block 202 illustrates that the method includes detecting that a portable electronic device is in motion. Accordingly, a system for providing feedback to a user of a portable electronic device in motion includes means for detecting that a portable electronic device is in motion. For example, as illustrated in FIG. 3, motion monitor component 302 is configured for detecting that a portable electronic device is in motion. FIGS. 4*a*-*b* illustrate motion monitor components 402 as adaptations and/or analogs of motion monitor component 302 in FIG. 3. One or more motion monitor components 402 operate in an execution environment 401.

In FIG. 4*a*, motion monitor component 402*a* is illustrated as a component of interaction subsystem 403*a*. In FIG. 4*b*, motion monitor component 402*b* is illustrated as a component of attention service 403*b*. In various aspects, adaptations and analogs of motion monitor component 302 in FIG. 3 may detect a PED 502 in motion. The motion detected may be relative to another object. A motion monitor component 402 may detect a PED 502 in motion by detecting motion of the PED 502 and/or by detecting motion of the object. The object may be another PED 502.

At least one PED 502 in FIG. 5 may include and/or otherwise provide an adaptation and/or analog of execution environment 401*a* including a motion monitor component 402*a*. Service node 504 may additionally or alternatively be included in and/or otherwise provide execution environment 401*b* including motion monitor component 402*b*. A motion monitor component 402 may detect a PED 502, in which it operates, in motion. Alternatively or additionally, a motion monitor component 402 may be adapted to detect that a PED 502 at a distance is in motion and/or that another type of object is in motion relative to a PED 502. All motion by definition is relative to some other object, such as motion relative to a star, Earth, a room, a piece of furniture, or another electronic device.

In various aspects, a motion monitor component 402 may include and/or may otherwise be configured to receive motion information from a motion sensing device that is configured to input for detecting motion of a PED 502. In one aspect, detecting that a portable electronic device is in motion may include receiving information from an accelerometer. In FIG. 5, first PED 502*a* may include an accelerometer. A motion monitor component 402*a* may operate in first PED 502*a* configured to receive motion information from the accelerometer. The motion monitor component 402*a* may determine and/or otherwise detect that first PED 502*a* is in motion relative to the planet and/or other object exerting a gravitational force. In another aspect, first PED 502*a* may send motion information received from an accelerometer to another electronic device, such as second PED 502*b* hosting a motion monitor component 402*a* illustrated in FIG. 4*a*, and/or to a service provider node illustrated by service node 504 hosting motion monitor component 402*b* illustrated in FIG. 4*b*.

In an aspect, detecting that a portable electronic device is in motion may include detecting an electromagnetic signal from another object. The portable electronic device may be detected to be in relative motion with respect to the other object in response to and/or otherwise based on detecting the electromagnetic signal. Exemplary electromagnetic signals include a radio signal, a microwave signal, an infrared signal, a visible light signal, an ultraviolet light signal, an X-ray signal, and a gamma-ray signal.

Motion monitor component 402*a*, in FIG. 4*a*, operating in first PED 502*a*, in FIG. 5, may detect a signal illustrated by first signal 508*a* which may be a radio signal and/or a sound output by second PED 502*b*. First PED 502*a* is illustrated being carried and/or otherwise transported by first user 510*a*, and second PED 502*b* is illustrated carried by and/or otherwise transported by second user 510*b*. Motion monitor component 402*a* in first PED 502*a* may detect additional signals 508*a* from second PED 502*b*. Motion monitor component 402*a* in first PED 502*a* may determine lengths of time between detecting the various signals. Motion monitor component 402*a* may compare the time lengths to detect whether a distance between first PED 502*a* and second PED 502*b* has changed indicating the two PEDs 502 are in motion with respect to each other.

Still further, motion monitor component 402*a* may determine a relative path of movement between first PED 502*a* and second PED 502*b* based on identifying directions from which the respective signals are received along with determining respective distances between the two PEDs 502. Based on a determined relative path of movement, motion monitor component 402*a* may be configured to determine whether first user 510*a* and second user 510*b* and/or their respective transported PEDs 502 will collide, to determine a probability of a collision, and/or to estimate a shortest distance that may occur between first user 510*a* and second user 510*b*, illustrated in FIG. 5, and/or between first PED 502*a* and second PED 502*b* carried and/or attached to the respective users 510.

Detecting that a portable electronic device is in motion relative to another object may include transmitting an electromagnetic signal. A reflected signal reflected by an object in a path of the transmitted signal may be received in response to the transmitted signal. As described above a change in distance and/or a relative path of movement between the portable electronic device and the object may be determined to detect whether the portable electronic device and the object are in motion with respect to one another.

In FIG. 5, motion monitor component 402*a* operating in second PED 502*b* may transmit first signal 508*a* such as a light signal. Motion monitor component 402*a* in second PED 502*b* may detect a reflection of the transmitted light, illustrated by reflected signal 508*b* in FIG. 5, via a light sensor in second PED 502*b*, FIG. 5 illustrates reflected signal 508*b* reflected by wall 512. Motion monitor component 402*a* in second PED 502*b* may determine a length of time between transmitting the first signal 508*a* and receiving the second signal 508*b*. Motion monitor component 402*a* in second PED 502*b* may determine a distance between second user 510*b* and/or second PED 502*b* and wall 512. Second PED 502*b* may transmit additional light signals and detect corresponding reflected signals to detect changes in distance between second PED 502*b* and wall 512, and/or to detect a path of motion of second PED 502*b* relative to wall 512. In another aspect, based on the strength of reflected signal 508*b*, motion monitor component 402*a* in second PED 502*b* may determine a size of wall 512 and or a material included in wall 512. Alternatively or additionally, based on receiving one or more other reflected signals in response to respective transmitted signals, motion monitor 402*a* in second PED 502*b* may detect a relative speed of motion; an acceleration; and/or changes in speed, acceleration, and/or distance. One or more of these and/or other such measures may be included in detecting relative motion between wall 512 and second PED 502*b* and/or between wall 512 and second user 510*b* by motion monitor component 402*a* in second PED 502*b*. Motion monitor component 402*a* in second PED 502*b* may be configured to determine a whether wall 512 and second user 510*b* will collide, determine a probability of a collision, and/or estimate a shortest distance that may occur between wall 512 and second user 510*b* and/or second PED 502*b*. The terms input device, sensor, and sensing device are used interchangeably herein.

In still another aspect, information based on transmitted and/or received electromagnetic signals by one or more PEDs 502 may be transmitted to motion monitor component 402*b* operating in service node 504 illustrated in FIG. 5. The information may be received by motion monitor component 402*b* via network 506 via a network interface component as described above. Motion monitor component 402*b* may detect whether one or both PEDs 502 are in motion relative to each other and/or relative another object as described above.

Also as described above, detecting that a portable electronic device is in motion relative to another object may include detecting a second electromagnetic signal from another object. A difference between a first attribute of the first electromagnetic signal and a second attribute of the second electromagnetic signal may be determined and/or otherwise identified. Relative motion may be detected based on the difference.

Detecting that a portable electronic device is in motion relative to another object may include detecting the portable electronic device and the object coming into contact. Analogously, detecting that a portable electronic device is in motion relative to another object may include detecting the end of physical contact between the portable electronic device and the object. In FIG. 5, first PED 502*a* may include one or more pressure sensitive sensors on one or more respective regions of outside surfaces of first PED 502*a*. A pressure sensitive area of a surface may be configured for detecting a change in pressure from a cause other than or in addition to a user input. For example, when first PED 502*a* is lifted from a table top by a user's hand a pressure sensitive sensor may be configured to detect a change in pressure caused by the weight of first PED 502*a* on the table, to detect pressure of the user's hand which can be detected by a change in pressure detected by the sensor in contact with the table, and/or by changes in pressure detected by sensors configured to detect pressure at other locations on the surface of first PED 502*a*. A motion monitor component 402 may be configured to associated a pattern of detected pressure changes with an activity such as putting first PED 502*a* down, walking while carrying first PED 502*a*, and driving with first PED 502*a* being transported by an automotive vehicle or other means of transportation.

In addition to detecting physical contact beginning and/or ending, detecting a PED 502 in motion may include detecting coming into and/or ending other types of contact such as communications contact as has been described above with respect to contact via electromagnetic signals. In addition to or instead of detecting electromagnetic waves, motion may be detected based on emitting and/or detecting sound waves, chemical signals, biological signals, and/or changes in physical forces such gravitational forces.

Detecting that a portable electronic device is in motion relative to another object may include detecting a change in sound. The sound may be received from an identified direction relative to a direction of an object from the portable electronic device. In FIG. 5, second PED 502*b* may include a microphone (not shown) for detecting sound. A motion monitor component 402*a* operating in second PED 502*b* may be configured to detect changes in sound. A directional microphone may be included in second PED 502*b* for interoperating with motion monitor component 402*a*. Motion monitor component 402*a* in second PED 502*b* may determine a direction of a source of the sound based on input detected by the directional microphone. Motion monitor component 402a in second PED 502b may detect relative motion by detecting a change in volume of a sound from a particular direction. Alternatively or additionally, motion monitor component 402a, in second PED 502b, interoperating with a directional microphone, may determine a path of relative motion based on a change in direction of a source of a sound detected over a given period of time.

Detecting that a portable electronic device is in motion may include detecting a change in a measure of heat where another other object is a source of the heat. In an aspect, first PED 502a may include an infrared image capture device. A motion monitor component 402a, in first PED 502a, may be configured to perform image analysis on two or more infrared images captured by the infrared image capture device. A change in size of an area of heat in two or more pictures may indicate a change in distance between first PED 502a and the object emitting heat corresponding to the area on the captured images. Motion monitor component 402a in first PED 502a may be configured to determine a change in distance between first PED 502a and/or a relative path of movement between first PED 502a and the object emitting the detected heat based on captured infrared images.

Detecting that a portable electronic device is in motion relative to an object may include receiving an indication from at least one of a vehicle transporting the portable electronic object and a vehicle transporting the object. A PED 502 may be configured to communicate with an automotive vehicle, directly and/or indirectly, via a peripheral communications link, such as USB cable, and/or via a network, such as network 506. The PED 502 may receive operational information about the automotive vehicle such as a temperature reading of an operational component of the automotive vehicle, a measure of speed, a measure of fuel flow, a measure of power flow, a rate of rotations of an operational component, and/or any other information indicating that the automotive vehicle is moving while transporting the PED 502.

Detecting that a portable electronic device is in motion relative to another object may include receiving data from at least one of a pedometer of a user transporting the portable electronic device and/or a pedometer of a user transporting the other object. In an aspect, a PED 502 may include a pedometer. In another aspect, a portable electronic device, such as first PED 502a, may be operatively coupled to a pedometer carried and/or attached to a user, such as first user 510a. In yet another aspect, second PED 502b may be communicatively coupled to a pedometer carried by and/or otherwise attached to first user 510a. Respective motion monitor components 402 operating in one or more of first PED 502a, second PED 502b, and service node 504 may detect motion of a PED 502 with respect to a user, another portable electronic device, and/or some other object carried by a user. A motion monitor component 402 may receive pedometer information indicating that a user is walking. For example, pedometer information may indicate when one or more steps have been taken by a user. In an aspect, a motion monitor component 402 may estimate a relative speed of movement of a user and/or a carried object, such a PED 502, based on a count of steps taken in a particular period of time.

The term "operating information" as used herein refers to any information accessible to a device that identifies an operational attribute of a device that is configured to perform an operation. Operating information for a portable electronic device and/or for an entity transporting device, such an automotive vehicle or a bicycle, may identify a speed, a direction, a route, an acceleration, a rate of rotation, a location, a measure of heat, a measure of pressure, a weight, a mass, a measure of force, an ambient condition, an attribute of the device's user, a measure of density based on attributes of objects within a specified location including the device, a measure of power consumed and/or available to the device, an attribute of an executable operating in an execution environment of the device, and the like. For example, data that identifies a vector or path of movement of a PED 502 may be included in and/or otherwise identified by operating information.

"Object information" as used herein is information that identifies information about an object in motion relative to a portable electronic device, and/or otherwise enables the detection of the object in the motion. For example, object information may identify a distance between an object and a portable electronic device and/or may identify a location of the object with respect to the portable electronic device. In various aspects, object information may include and/or otherwise provide access to a measure of size of an object, a type of the object, an owner of the object, a material composing and/or otherwise included in the object, a measure of weight of the object, a measure of mass of the object, a measure of speed of the object, a measure of acceleration of the object, a direction of movement of the object, a monetary value of the object, a user of the object and/or an attribute of the user, operating information if the object is a device, and the like.

A motion monitor component 402 may be adapted to receive object information about an object in any suitable manner, in various aspects. For example object information may be received via one or more of a message transmitted via network, a communications interface, an input device, an invocation mechanism, an interprocess communication (IPC) mechanism, a register of a hardware component, a hardware interrupt, and a software interrupt.

In an aspect, motion monitor component 402a in FIG. 4a operating in first PED 502a in FIG. 5 may receive object information from second PED 502b via a network and/or via a direct communication link. A motion monitor component 402a may detect that the two PEDs 502 are in motion relative to one another. First PED 502a may receive the object information about second PED 502b and/or about another object such as wall 512 via service node 504. Service node 504 may include a database including information about fixed objects such as wall 512 and may receive real-time information about PEDs 502 from the respective PEDs 502. In another aspect, motion monitor component 402b may operate in service node 504. One or more PEDs 502 and one or more objects may provide object information received by service node 504 for processing by motion monitor component 402b. Motion monitor component 402b may detect relative motion between a PED 502 and another object based on the received respective object information.

A motion monitor component 402a, in FIG. 4a, in first PED 502a, in FIG. 5, and/or a motion monitor component 402b in service node 504 may receive object information from an automotive vehicle (not shown), from first PED 502a, and/or from another object. Object information about a particular object may be preconfigured for motion monitor component 402a and/or motion monitor component 402b. For example, a data store with location information for various objects with fixed locations and/or otherwise known locations may be included in and/or otherwise accessible to PED 502a, service node 504, and/or to the automotive vehicle.

An instance or analog of execution environment 401a in FIG. 4a may operate in second PED 502b. Motion monitor component 402a operating in second PED 402b may receive object information in a message received via network stack 407a and optionally via application protocol component 409a. Second PED 502b may request object information via a network such as network 506 including first PED 502a and/or some other object, such as a pedometer described above. Alternatively or additionally, second PED 502b may listen for a heartbeat message via a wireless receiver in a network adapter indicating another object, such as first PED 502a, has come into in range of the wireless network. Alternatively or additionally, attention service 403b may interoperate with a network interface adapter and/or network stack 407b to activate listening for a heartbeat message. Network 506 may be a local area network (LAN) with a limited range. One or more objects other than portable electronic devices may be detected by motion monitor component 402b based on one or more received messages that may identify a location for each of one or more objects where the location or locations are in a region defined by the range of the LAN. In another aspect, attention service 403b may send a request for object information. A PED 502 may be configured to receive the request and sent a message in response including and/or otherwise identifying object information. Attention service 403b may provide the received object information to motion monitor component 402b for detecting movement of the PED 502 within a range of service node 504.

Receiving object information may include receiving the object information via a physical communications link, a wireless network, a local area network (LAN), a wide area network (WAN), and/or an internet. Object information may be received via any suitable communications protocol, in various aspects. Exemplary protocols include a universal serial bus (USB) protocol, a BLUETOOTH protocol, a TCP/IP protocol, hypertext transfer protocol (HTTP), a remote procedure call (RPC) protocol, a protocol supported by a serial link, a protocol supported by a parallel link, and Ethernet. Receiving object information may include receiving a response to a request previously sent via a communications interface. Receiving object information may include receiving the object information in data transmitted asynchronously. An asynchronous message is not a response to any particular request and may be received without any associated previously transmitted request.

In yet another aspect, illustrated in FIG. 4b, network application platform component 405b may receive object information in a message transmitted via network 506. The message may be routed within execution environment 401b to motion monitor component 402b by network application platform 405b. For example, the message may include a universal resource identifier (URI) that network application platform 405b is configured to associate with motion monitor component 402b. In an aspect, first PED 502a may send object information to service node 504 via network 506. In another aspect, attention service 403b may be configured to monitor one or more PEDs 502 and/or other objects. A component of attention service 403b, such as motion monitor component 402b, may periodically send respective messages requesting object information via network 506 to the respective PEDs 502, other objects, and/or proxies for PEDs 502 and/or other objects. A PED 502, other object, and/or a proxy may respond to a request by sending a response message including object information. The response message may be received and the object information may be provided to motion monitor component 402b as described above and/or in an analogous manner.

Returning to FIG. 2, block 204 illustrates that the method further includes detecting an interaction between a user and the portable electronic device during the motion. Accordingly, a system for providing feedback to a user of a portable electronic device in motion includes means for detecting an interaction between a user and the portable electronic device during the motion. For example, as illustrated in FIG. 3, interaction monitor component 304 is configured for detecting an interaction between a user and the portable electronic device during the motion. FIGS. 4a-b illustrate interaction monitor components 404 as adaptations and/or analogs of interaction monitor component 304 in FIG. 3. One or more interaction monitor components 404 operate in execution environments 401.

Interaction monitor component 404a in FIG. 4a and/or interaction monitor component 404b in FIG. 4b may be adapted to detect interaction in any suitable manner, in various aspects of the subject matter described herein. For example detecting an interaction may include receiving interaction information. Interaction information may be received via one or more of a message transmitted via a network, a communications interface, an invocation mechanism, an interprocess communication (IPC) mechanism, a register of a hardware component, a hardware interrupt, a software interrupt, and an input device.

In an aspect, interaction monitor component 404a, illustrated in FIG. 4a, may detect an interaction based on receiving interaction information via a hardware interrupt in response to insertion of a smart card in a smart card reader in and/or operatively attached to first PED 502a. In another aspect, one or more input drivers 423a operating in second PED 502b may detect user input from a button or sequence of buttons in second PED 502b. The button or buttons may receive input for an application accessible in and/or otherwise via second PED 502b, and/or may receive input for a hardware component in and/or accessible via second PED 502b The input(s) may be associated with a particular user of second PED 502b by interaction monitor component 404a in second PED 502b which may include and/or otherwise may be configured to operate with an authentication component (not shown). The authentication component may operate, at least in part, in a remote node, such as service node 504. User ID and/or password information may be stored in persistent storage accessible within and/or via an execution environment 401a. For example, user ID and password information may be stored in a data storage device of service node 504.

In another aspect, illustrated in FIG. 4a, an interaction monitor component 404a in first PED 502a may detect an interaction by receiving interaction information in a message received via network stack 407a and optionally via application protocol component 409a. First PED 502a may receive the message asynchronously or in response to a request sent to second PED 502b or to a node other than a PED 502. Interaction subsystem 403a may interoperate with a network interface adapter and/or network stack 407a to receive the message. In response to receiving the message, interaction subsystem 403a may send the interaction information via a message queue to be received by interaction monitor component 404a configured to monitor the message queue.

Alternatively or additionally, interaction monitor component 404a operating in first PED 502a may receive interaction information via a communications interface component communicatively linking first PED 502a with second PED 502b, another object, and/or a proxy. In an aspect, first PED 502a may be operatively coupled to a BLUETOOTH port included in and/or otherwise coupled to a communications interface component. The BLUETOOTH port in first PED 502a may detect an active communication link to second PED 502b based on a signal received from second PED 502b via the BLUETOOTH link. Interaction information may be sent to interaction subsystem 403a for receiving by interaction monitor component 404a in response to a request to second PED 502b and/or from service node 504.

Receiving interaction information may include receiving the interaction information via a physical communications link, a wireless network, a local area network (LAN), a wide area network (WAN), and an internet. Interaction information may be received via any suitable communications protocol, in various aspects. Exemplary protocols includes a universal serial bus (USB) protocol, a BLUETOOTH protocol, a TCP/IP protocol, hypertext transfer protocol (HTTP), a remote procedure call (RPC) protocol, a serial protocol, Ethernet, and/or a parallel port protocol. Receiving interaction information may include receiving a response to a request previously sent via communications interface. Receiving interaction information may include receiving the interaction information in data transmitted asynchronously.

In yet another aspect, illustrated in FIG. 4b, network application platform component 405b may receive interaction information in a message transmitted via network 506. The message and/or message content may be routed within execution environment 401b to interaction monitor component 404b for receiving interaction information in and/or otherwise identified by the message sent from a PED 502. The interaction information may be provided to interaction monitor component 404b by network application platform 405b. For example, the message may be received via a Web or cloud application protocol interface (API) transported according to HTTP. The message may identify a particular service provided, at least in part, by interaction monitor component 404b. In still another aspect, a message identifying interaction information may be received by interaction monitor component 404b in service node 504 where the message is sent by first PED 502a. In another aspect, first PED 502a may receive the interaction information from second PED 502b for forwarding to service node 504 via network 506.

In still another aspect, in response to detecting an incoming communication identifying an interaction between second user 510b and second PED 502b as a participant in the communication with another user, second PED 502b may send interaction information to service node 504 via network 506. The term "communicant" refers to a user participant in a communication with another user, as used herein.

Attention service 403b operating in service node 504 may be configured to monitor one or more PEDs 502. A component of attention service 403b, such as interaction monitor component 404b may periodically send a message via network 506 to a PED 502 requesting interaction information. The PED 502 may respond to the request by sending a message including interaction information. The message may be received and the interaction information may be provided to interaction monitor component 404b as described above and/or in an analogous manner.

In various aspects, adaptations and analogs of interaction monitor component 304, in FIG. 3, may monitor a user of, for example, first PED 502a by receiving interaction information from an input device. Either or both PEDs 502 may include an instance and/or analog of execution environment 401a and an instance and/or analog of interaction monitor component 404a configured for processing interaction information. The input device may be included in first PED 502a, may operate in another PED illustrated by PED 502b, or may operate in a node that is not included in a PED 502 illustrated in FIG. 5 by service node 504. Interaction information may include and/or may otherwise be based on input information generated in response to any input and/or group of inputs for detecting and/or otherwise determining whether a specified attention criterion is met for first PED 502a. Exemplary input devices include a microphone, a display, a key, a touchpad, a touch screen, and a pointing device.

In an aspect, interaction information for a PED 502 may be received based on a lack of input detected by an input device and/or by detecting attention directed to an activity and/or object not included in operating the PED 502. For example, a gaze detector for detecting interaction input for a PED 502 may not detect the gaze of the user of the PED 502 at a particular time and/or during a specified time period. Interaction information indicating the PED 502 has not been viewed by the user at the particular time and/or during the particular time period may be received by interaction monitor component 404a in FIG. 4a from the gaze detector. The gaze detector may be in, for example, first PED 502a and/or otherwise operatively coupled to execution environment 401a in first PED 502a for interoperating with interaction monitor component 404a. In another aspect, interoperation between the gaze detector and interaction monitor component 404a may be via a network. For example, the gaze detector may be included in first PED 502a and interaction monitor component 404a may operate in an instance of execution environment 401a in second PED 502b.

Interaction monitor components 404 in FIG. 4a and/or in FIG. 4b may include and/or otherwise interoperate with a variety of input devices. In an aspect, a scroll wheel included in first PED 502a may receive input from first user 510a indicating interaction between first user 510a and first PED 502a. Interaction monitor component 404a may receive interaction information in response to the detected scroll wheel input indicating a physical movement of first user 510a of first PED 502a. Input received via other input controls may result in interaction information detectable by an interaction monitor component 404a. Exemplary input controls include buttons, switches, levers, toggles, sliders, lids, and the like.

Interaction monitor components 404 in FIG. 4a and/or in FIG. 4b may detect and/or otherwise receive interaction information identifying a measure of interaction, determined based on a specified interaction metric that indicates a degree or level of attention of a user, operating a PED 502, to some or all of the PED 502. For example, a sensor in headgear worn by the user may detect the user's head pointing in a direction of a location that includes the PED 502. The sensor may detect a length of time the user's head is directed towards the PED 502, a number of times the user's head is directed towards the PED 502 in a specified period of time, and/or a pattern of head movements with respect to the PED 502 detected over a period of time. The sensor in the headgear may interoperate with an interaction monitor component 404a that is in the PED 502, that is operatively coupled to an interaction monitor component 404a in another PED 502, and/or that is operatively coupled to interaction monitor component 404b operating in service node 504. Interaction information received by and/or from the sensor in the headgear may identify and/or may be included in determining a measure of interaction, according to a specified metric for measuring interaction of a user. The measure of interaction may indicate whether interaction is occurring and/or may identify a level of interaction that is occurring between the user and the PED 502.

An interaction monitor component 404 may detect and/or otherwise receive interaction information based on other parts of a user's body. Interaction information may be received by an interaction monitor component 404a and/or interaction monitor component 404b based on an eye, an eyelid, a head, a chest, an abdomen, a back, a leg, a foot, a toe, an arm, a hand, a finger, a neck, skin, and/or hair; and/or portion of a user body that is monitored. An interaction monitor component 404 may detect and/or otherwise receive interaction information identifying, for a part or all of a user, a direction of movement, a distance of movement, a pattern of movement, and/or a count of movements of one or more parts of the user's body used in interacting with the PED 502.

In an aspect, a gaze detector included in first PED 502a may detect the user's eye movements to determine a direction of focus and/or a level of focus directed towards a particular operational component, such as a display, of first PED 502a. Interaction monitor component 404a in FIG. 4a may include and/or otherwise be operatively coupled to the gaze detector. In another aspect, a gaze detector in first PED 502a may be communicatively coupled to interaction monitor component 404b operating in service node 504 via network 506. Alternatively or additionally, the gaze detector in first PED 502a may be communicatively coupled to an instance or analog of an interaction monitor component 404a operating in second PED 502b via network 506 and/or via a direct physical communications link.

An interaction monitor component 404 in FIG. 4a and/or in FIG. 4b may receive interaction information for a PED 502 and/or for another object by receiving information from the PED 502 in response to user interaction with the PED 502. Interaction monitor component 404a may receive interaction information by monitoring attention to another object. A gaze detector and/or other sensing device may be at least partially included in the PED 502 and/or at least partially on and/or in the user of the PED 502. For example, a user may wear eye glasses and/or other gear that includes a motion sensing device detecting direction and/or patterns of movement of a head and/or eye of the user.

Alternatively or additionally, an interaction monitor component 404 in FIG. 4a and/or in FIG. 4b may include and/or otherwise may communicate with other sensing devices. An interaction monitor component 404 may interoperate with various types of head motion sensing devices included in a PED 502 and/or worn by a user. Parts of a PED 502 may detect touch input directly and/or indirectly via, for example, depressible buttons, rotatable dials, multi-position switches, and/or touch screens. A PED 502 may include one or more microphones for detecting sound and determining a direction of a head of a user. Other sensing devices that may be included in a PED 502, included in the user, and/or attached to the user include galvanic skin detectors, breath analyzers, detectors of bodily emissions, and detectors of substances taken in by the user such as alcohol.

FIG. 4b illustrates interaction monitor component 404b operating external to a PED 502. Interaction monitor component 404b operating in service node 504 may receive interaction information for the PED 502 via network 506. Interaction monitor component 404b in FIG. 4b may receive interaction information from one or more of the exemplary sensing devices described above with respect to FIG. 4a. Interaction monitor component in 404b operating in service node 504 may interoperate with one or more PEDs 502. In an aspect, interaction monitor component 404b may monitor interaction between first user 510a and first PED 502a' and may also monitor interaction between second user 510b and second PED 502b.

An interaction metric may measure interaction in terms of a number of predefined states or interaction statuses that are discrete. A metric may provide a mathematical measure of interaction determined by evaluating a continuous function. Interaction information, in an aspect, may further identify an object receiving and/or not included in an interaction with the user, or may identify a space to which the user's attention is directed and/or a space to which some or all of the user's attention is not directed; indicating a space with which the user may be respectively interacting and not interacting with an object.

Interaction and/or lack of interaction with a portable electronic device may be detected without receiving an intentional input from a user and/or without presenting a user-detectable output. For example, a motion monitor may detect a user's head turn in the direction towards a PED 502. Interaction information identifying the user's head is turned towards the PED 502 may be received and/or used as interaction information for the PED 502 indicating the user may be, at least visually, interacting with the PED 502. The interaction information may serve to indicate a lack of user interaction with one or more objects other than the PED 502.

In an aspect, a user press of a touch screen may be detected. An interaction monitor component 404 in FIGS. 4a-b may receive interaction information in response to the detecting of the press by the user of the PED 502. The interaction information may identify a change in the user's interaction with the PED 502. Alternatively or additionally, the interaction information received, in response to detecting the press, may identify a measure of interaction with the PED 502 over a period of time when combined with information based on other detected inputs in the time period. Received interaction information may identify a lack of interaction with the PED 502. Interaction information may identify a relative measure of interaction, an absolute measure of interaction, interaction with a particular object and/or interaction not directed to a particular object.

In another aspect, interaction information may be reported by a user for receiving by one or more interaction monitor components 404 in one or more respective PEDs 502 and/or in one or more respective service nodes 504. A user may report interaction information based on observation of a portable electronic device, observation of a user, and/or observation of some other object. A user may report interaction information based on knowledge of a portable electronic device, such as a whether the portable electronic device is configured for playing games and/or for voice communication; and/or based on knowledge of a user, such as a disability, a medication effect, sleepiness, observed activity of the user, and/or ambient condition for the user.

In various aspects, an interaction subsystem 403 may be adapted to evaluate an attention criterion based on a detected interaction. FIG. 4a and FIG. 4b illustrate attention condition components 425 each adapted to evaluate an attention criterion based on an interaction detected by one or more interaction monitor components 404.

In various aspects, a measure of interaction with a portable electronic device by a user may be included in identifying an attention criterion for evaluating and/or for determining whether an attention criterion is met. An attention criterion based on interaction with a portable electronic device may be identified for evaluation and/or may otherwise be evaluated based on an attribute of the user of the portable electronic device, an attribute of one or more objects in motion relative to the portable electronic device, an attribute of a relative motion of the portable electronic device with respect to another object, a location of the portable electronic device, and/or an ambient condition, to name a few examples. Predefined and/or dynamically determined attributes may be included in determining whether a measure of interaction between a user and a portable electronic device meets an attention criterion or not. For example, one or more of a speed of movement of a portable electronic device relative to another object, a rate of acceleration, a measure of ambient light, a measure of congestion of users and/or other objects in a location including the portable electronic device, and/or an age of the user of the portable electronic device may be included in determining whether an attention criterion is met. An attention criterion may specify a threshold condition based on a metric for measuring interaction. The threshold condition may be specified so that it is met when the specified threshold is met and/or crossed based on received interaction information.

Attention condition component 425a in FIG. 4a and/or attention condition component 425b in FIG. 4b may interoperate with a timer component (not shown), to set a timer with a given duration. The duration and/or a particular time for setting the timer may be identified by configuration information. For example, a timer may be set at regular intervals and/or in response to one or more specified events such as a change in an application operating in a PED 502 and/or a change in a type and or level of user interaction with the PED 502. A timer may be set in response to receiving interaction information. For example, interaction monitor component 404a may detect a user's visual interaction with first PED 502a. In response, attention condition component 425a, may be invoked to instruct a clock component (not shown) to start a timer for detecting a time period for determining whether an attention criterion is met.

In various aspects, an attention condition component 425 in FIG. 4a and/or in FIG. 4b may detect an expiration of a timer as identifying a time period. A measure of interaction and/or an attention criterion may be based on time. Alternatively or additionally, a time period may be detected indirectly through detecting the occurrence of other events that bound and/or otherwise identify a start and/or an end of a time period. Time periods may have fixed and/or may have varying durations. Time may be measured in regular increments as is typical, but may also be measured by the occurrence of events that may occur irregularly as compared to the regularity of, for example, a processor clock. For example, time may be measured in distance traveled by a PED 502, based on a velocity of a PED 502, based on interaction events detected by one or more components of a PED 502, and/or time may be measured in terms of detected objects external to a PED 502 such as another PED 502.

Identifying that an attention criterion is met may include detecting a specified time period indicating that the criterion is to be tested. For example, a timer may be set to expire every thirty seconds to indicate that an attention criterion for a PED 502 is to be tested. In another example, a start of a time period may be detected in response to attention condition component 425b receiving a first indicator of visual interaction based on detected visual interaction. An end of the time period may be detected in response to attention condition component 425b receiving a subsequent indicator of visual interaction. Attention condition component 425b may measure a duration of the time period based on receiving the first indicator and the subsequent indicator.

Alternatively or additionally, detecting a time period for determining whether an attention criterion is met may include detecting a time period during which no input is detected that would indicate a user is interacting with a portable electronic device for at least a portion of the time period. The at least a portion may be defined by a configuration of a particular attention condition component 425. For example, a time period may be defined based on detecting that a specified number of indicators of visual interaction are received in the time period and/or based on a measure of time between receiving indicators of visual interaction in the time period.

Alternatively or additionally, identifying that an attention criterion is met may include detecting interaction with something other than the PED 502 for at least a portion of a detected the time period. As similarly described in the previous paragraph, the at least a portion of the time period may be defined by a configuration of a particular attention condition component 425. A time period or portion thereof may be defined based on detecting a particular number of indicators of visual interaction received in the time period and/or based on a measure of time between receiving indicators of visual interaction in the time period.

An attention condition component 425, in FIG. 4a and/or in FIG. 4b, may receive and/or otherwise evaluate an attention criterion. An attention criterion may be tested and/or otherwise detected based on received interaction information or on not receiving interaction information at a particular time and/or during a specified time period. That is, the attention criterion may be time-based. An attention criterion may be selected and/or otherwise identified from multiple attention criteria for testing based on a duration of a detected time period of a specified lack of interaction.

A measure of the duration of a time period of low interaction may be provided as input for testing and/or otherwise evaluating an attention criterion by attention condition component 425a in FIG. 4a and/or attention condition component 425b in FIG. 4b. A variety of criterion may be tested in various aspects. An attention criterion may be based on a particular portable electronic device, an object other than the portable electronic device, a user, a relative speed of motion, another portable electronic device, a geospatial location of a portable electronic device, a current time, a day, a month, and/or an ambient condition, to name a few examples.

Returning to FIG. 2, block 206 illustrates that the method yet further includes receiving image data, for a first object, captured by an image capture device during the motion. Accordingly, a system for providing feedback to a user of a portable electronic device in motion includes means for receiving image data, for a first object, captured by an image capture device during the motion. For example, as illustrated in FIG. 3, capture manager component 306 is configured for receiving image data, for a first object, captured by an image capture device during the motion. FIGS. 4a-b illustrate capture manager component 406b as adaptations and/or analogs of capture manager component 306 in FIG. 3. One or more capture manager components 406b operate in execution environments 401.

In various aspects, capture manager component 306, in FIG. 3, and its adaptations may be configured to receive image data in any suitable manner. For example, image data may be received via one or more of a message transmitted via a network, via a communications interface, an invocation mechanism, an interprocess communication (IPC) mechanism, a register of a hardware component, a hardware interrupt, and a software interrupt.

FIG. 4a and FIG. 4b illustrate capture subsystems 415 configured to interoperate with one or more capture devices, as illustrated by image capture device 427a in FIG. 4a. Exemplary capture devices include still image capture devices and video capture devices. An image capture device may be configured to detect visible light in capturing an image and/or may be configured to detect light that is not visible to humans. For example, image data may be received from an infrared image capture device. Capture subsystem 415a may be operatively coupled to one or more capture devices (not shown) external to execution environment 401a in a PED 502. Capture subsystem 415b may be operatively coupled to one or more capture devices external to execution environment 401b in service node 504. Alternatively or additionally, a capture subsystem 415 may be communicatively coupled to a capture device via a network. The communicative coupling may include a proxy device. For example, a node may be operatively coupled to a capture device via a peripheral interface such as a USB port. The node may be operatively coupled to a network. A capture subsystem 415 may be communicatively coupled to the node via a network and a corresponding capture manager 406 may receive image data from the capture device via the proxy node.

In an aspect, a capture manager component 406 may continuously and/or automatically receive image data via a communicative coupling of a corresponding capture subsystem 415 to an image capture device. A motion monitor component 402 may be configured to interoperate with a capture manager component 406 to receive captured image data in response to detecting a PED 502 in motion. Alternatively or additionally, an interaction monitor component 404 may be configured to interoperate with a capture manager component 406 to receive captured image data in response to detecting an interaction with a user of a PED 502. Alternatively or additionally, a component of interaction subsystem 403a and/or attention subsystem 403b may interoperate with a capture manager component 406 to receive captured image data in response to detecting that an attention criterion is met.

In another aspect, a capture manager component 406 may receive image data in response to an instruction from a component of interaction subsystem 403a and/or attention subsystem 403b directing a capture subsystem to capture the image data. The image data may be captured in response to one or more of detecting a PED 502 in motion, detecting a user interaction with interaction a PED 502, and determining that an attention criterion is met as described above. A motion monitor component 402 may be configured to interoperate with a capture subsystem 415 to capture image data in response to detecting a PED 502 in motion. Alternatively or additionally, an interaction monitor component 404 may be configured to interoperate with a capture subsystem 415 to capture image data in response to detecting an interaction with a user of a PED 502. Alternatively or additionally, a component of interaction subsystem 403a and/or attention subsystem 403b may interoperate with a capture subsystem 415 to capture image data in response to detecting that an attention criterion is met. A capture manager component 406 may receive the captured image data described in the various aspects above.

Receiving image data may include sending a request to retrieve the image data; and receiving the image data in a response to the request. A capture manager component 406 may receive image data in response to requesting image data from an image capture device. A capture subsystem 415 may provide image data captured prior to the request and/or may provide image data capture after the request. A capture subsystem 415 may direct a capture device to capture image data in response to a request for image data from the capture manager 406. In another aspect, image data may be received automatically by a capture manager component 406 in response to a capture device capturing image data. A request for image data may not be required. A request to capture image data and a request to receive image data may be requested together and/or in separate requests in various aspects.

As described above, a capture manager component 406 may be configured to receive image data from one or more image capture devices in a plurality of image capture devices. The image capture devices may be included in a PED 502 and/or located external to the PED 502 to capture image data from respective perspectives with respect to the PED 502. Receiving the image data may include identifying some or all of the image capture devices based on one or more of a detected motion of a portable electronic device, a detected interaction between a user and the portable electronic device, and a met attention criterion. Image data may be received from the identified image capture device or image capture devices. In one aspect, an attention criterion may be met based on an object in relative motion to a PED 502 to the right of a PED user 510 of the PED 502. The PED 502 may include image capture devices in a top portion, a left portion, and a right portion of the PED 502. In response to an attention condition component 425 detecting that the attention criterion is met, the attention condition component 425 and/or another component may interoperate with a capture manager component 406 to receive image data captured of the object from the image capture device in the right portion of the PED 502. Alternatively or additionally, in response to a motion monitor component 402 detecting the PED 502 in motion relative to an object in front of the PED user 510, motion monitor component 402 and/or another component of may interoperate with a capture manager component 406 to receive image data captured of the object from the image capture device in the top portion of the PED 502. Alternatively or additionally, in response to an interaction monitor component 404 detecting the PED user 510 interacting with the PED 502 while in motion relative to an object to the left of the PED user 510, interaction monitor component 404 and/or another component of an interaction subsystem 403 may interoperate with a capture manager component 406 to receive image data captured of the object from the image capture device in the left portion of the PED 502.

In another aspect, an image capture device may be included in movable housing. Receiving image data may include sending an instruction to a housing controller component (not shown) to move the movable housing based on one or more of a detected motion of a portable electronic device, a detected interaction between a user and the portable electronic device, and a met attention criterion. In one aspect, an attention criterion may be met for an object in relative motion to a PED 502 to the right of a PED user 510 of the PED 502. The PED 502 may include an image capture device in a movable housing. In response to an attention condition component 425 detecting that the attention criterion is met, an attention condition component 425 and/or another component may interoperate with a capture subsystem 415 to direct the housing to be placed in a position pointing the image capture device to the right of the PED 502 from the PED user's perspective to receive image data captured of the object. Alternatively or additionally, in response to a motion monitor component 402 detecting the PED 502 in motion relative to an object in front of the PED user 510, motion monitor component 402 and/or another component may interoperate with a capture subsystem 415 to direct the housing to be placed in position pointing the image capture device forward from the PED user's perspective to receive image data captured of the object. Alternatively or additionally, in response to an interaction monitor component 404 detecting the PED user 510 interacting with the PED 502 while in motion relative to an object to the left of the PED user 510, interaction monitor component 404 and/or another component may interoperate with a capture subsystem 415 to direct the housing to be placed in position pointing the image capture device to the left of the PED 502 from the PED user's perspective to receive image data captured of the object.

Returning to FIG. 2, block 208 illustrates that the method yet further includes sending, in response to both detecting the interaction and detecting the motion, the image data for presenting an image of the first object by a display device that is viewable to the user during the motion. Accordingly, a system for providing feedback to a user of a portable electronic device in motion includes means for sending, in response to both detecting the interaction and detecting the motion, the image data for presenting an image of the first object by a display device that is viewable to the user during the motion. For example, as illustrated in FIG. 3, attention director component 308 is configured for sending, in response to both detecting the interaction and detecting the motion, the image data for presenting an image of the first object by a display device that is viewable to the user during the motion. FIGS. 4a-b illustrate attention director component 408 as adaptations and/or analogs of attention director component 308 in FIG. 3. One or more attention director components 408 operate in execution environments 401.

In various aspects, attention director component 308, in FIG. 3, and its adaptations may be configured to send image data in any suitable manner. For example, image data may be sent via one or more of a message transmitted via a network, a communications interface, an invocation mechanism, an interprocess communication (IPC) mechanism, a register of a hardware component, a hardware interrupt, and a software interrupt.

In FIG. 4a, attention director component 408a may interoperate with presentation subsystem 417a, directly and/or indirectly, to send image data for and object as and/or otherwise included in attention information to an output device to present an image of the object as an attention output. The attention output may be presented to a user of a PED 502 to alter a direction of, object of, and/or other attribute of attention for the user of the PED 502 to direct the user's attention away from the PED 502 causing the user to interact with the object. For example, an attention output may attract, instruct, and/or otherwise direct attention from the user of PED 502 to receive sensory input from an object in front of the user, based on a met attention criterion. Presentation subsystem 417a may be operatively coupled, directly and/or indirectly, to a display for presenting the image.

The term "attention output" as used herein refers to a user-detectable output to attract, instruct, and/or otherwise direct the attention of a user of a portable electronic device. An attention output may be defined to direct attention of a user away from a portable electronic device. For example, a message box may include an image of an object. The message box may include an instruction to the user of the portable electronic device to look up and away from the portable electronic device. Such as message box is an attention output. The presented image by itself may be presented as an attention output.

In FIG. 4a, a UI element handler component 411a in and/or otherwise operatively coupled to attention director component 408a may send attention information including image data for presenting an attention output including an image based on the image data to the user of first PED 502a to instruct the user to direct attention and/or otherwise change an attribute of the user's attention away from the PED 502 to be aware of another object via sensory input received from the other object. The UI element handler component 411a may invoke presentation controller 413a to interoperate with an output device via presentation subsystem 417a, as described above, to present the attention output. Presentation controller 413a may be operatively coupled, directly and/or indirectly, to a display and may also be operatively coupled to a light, an audio device, a device that moves, and the like.

In an aspect, an attention director component 408 may be configured to send color information to present a color in an image and/or associated with an image of an object in motion relative to a PED 502. The image and color may be presented on a display screen of the PED 502. The color may be presented in a UI element including the image of the object in relative motion with respect to the PED 502 to direct the user to interact with the object and/or to change an attribute of interaction with the object. For example, an attention output may be presented to increase interaction with the object.

In another aspect, an attribute such as color may be used to rank and/or otherwise prioritize one or more sources from which the user may be directed for receiving sensory input. A first color may identify a higher attention output with respect to a lesser attention output indicated by a second color. For example, red may be defined as higher priority than orange, yellow, and/or green. Red may be presented in response to detecting that an attention criterion is met in and/or associated with an attention output for directing a user to look left for receiving sensory input, while yellow may be in and/or associated another attention output presented at the same time directing the user to look behind according to one or more objects detected to be in motion relative to the portable electronic device.

Figure 6:
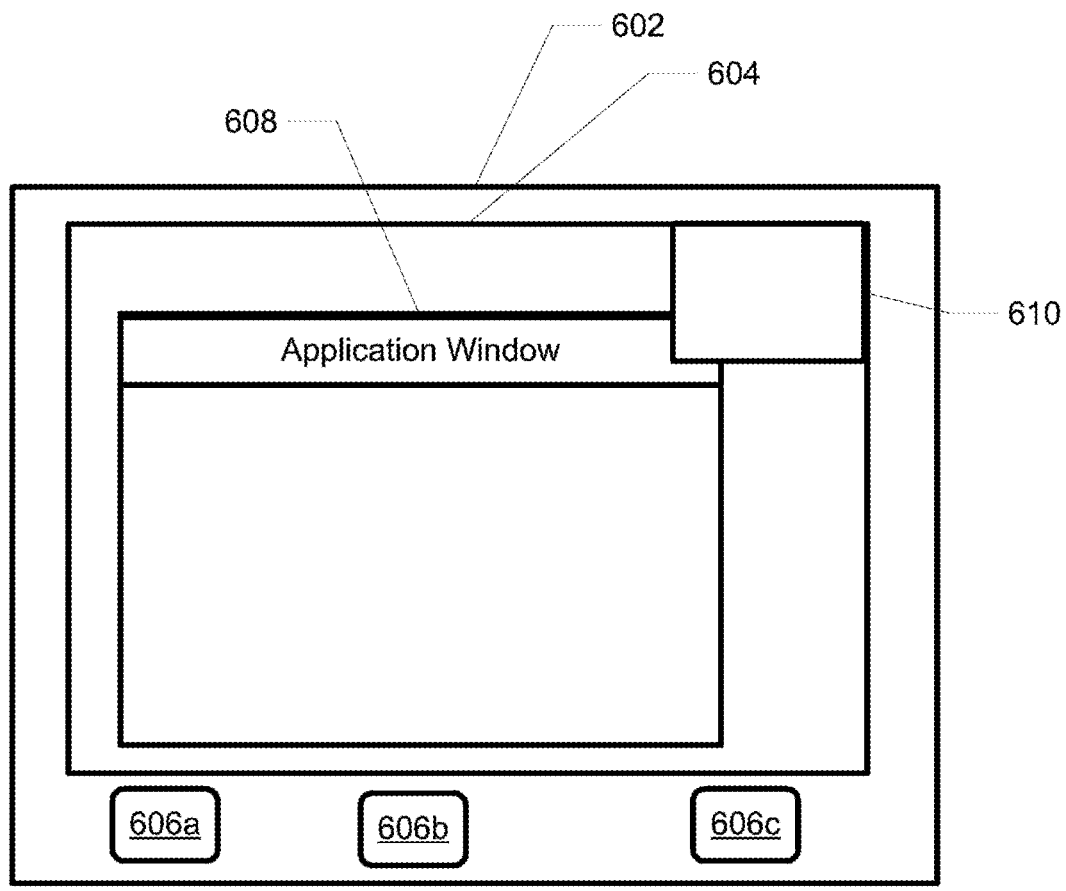
FIG. 6 is a diagram illustrating a user interface presented to a user of a portable electronic device in another aspect of the subject matter described herein.

FIG. 6 illustrates user interface elements presented by a display of a portable electronic device. FIG. 6 illustrates PED 602 including a presentation space 604 of a display device included in PED 602. PED 602 is illustrated including input controls 606a-c for receiving user input in an interaction between the user and PED 602. FIG. 6 illustrates application window 608, which may be included in a user interface of an application at least partially operating in PED 602. The user of PED 602 may be walking and interacting with the application via output presented via application window 608 and/or one or more input controls 606. An attention condition component 425 in and/or otherwise operatively coupled to PED 602 may determine that an attention criterion is met. Attention information including captured image data may be sent, in response, to present attention output 610 to direct attention of the user away from PED 602 to receive input from an object in motion relative to PED 602. Attention output 610 includes an image of the object presented based on received image data captured during the motion. The image may be included in a still image and/or in a video presented in attention output 610. Attention outputs may take any suitable form, some of which are described above. In FIG. 6, attention output 610 may present an image based on infrared image data captured by an infrared camera and/or a low-light image capture device.

Attention output 610 may be presented in a location that is defined to direct attention of a user of PED 602 based on the location. In FIG. 6, attention output is presented in the top, right corner of display presentation space 604. The top, right corner may be defined to direct the user to look up and to the right. To direct a user to look behind, an attention output including an image of an object in motion relative to PED 602 may be presented in a UI element that rotates the image to indicate a direction behind the user. Attention outputs may also be defined to direct a user's audio attention, tactile attention, and/or other sensory attention.

Attention information representing an attention output to direct a user's attention away from a portable electronic device may include presentation information for changing a border thickness in a border in a user interface element in and/or surrounding some or all of an image of a object in motion relative to a portable electronic device. For example, to attract attention to the left of a user of PED 602, attention information may be sent to change the thickness of the left border of application window 608 while presenting an image of an object to the left of the user in attention output 610. An attention director component 408a operating in PED 602 in FIG. 6 may send attention information to presentation controller 413a to present a front-left indicator by causing the thickness of the left border of application window 608 to change in a manner defined to direct the user's attention to the front-left with respect to the user's position to receive sensory input from the object located in the indicated direction.

A visual pattern may be presented via an output device. The pattern may direct attention and/or otherwise alter an attribute of attention of a user of a PED 502 to an object, in motion relative to the PED 502, as a source of sensory input for detecting by the user. An output pattern may also direct a user to change direction, speed, and/or a location with respect to an object in motion relative to the PED 502. A visual pattern may be integrated into an image presented based on captured image data.

In an aspect, a sensor in second PED 502b may receive input from an eye of second user 510b of second PED 502b gazing at a display of second PED 502b. Attention director component 408b in service node 504 may send a message including attention information including image data of first PED 502a and/or first user 510a, via network 506 to second PED 502b, to present an attention output. Second PED 502b and first PED 502a may be in motion with respect to each other. The message may be sent to present an attention output to second user 510b via second PED 502b. Alternatively or additionally, an instance of attention director component 408a operating in first PED 502a may send attention information to second PED 502b to present an attention output to the user of second PED 502b.

An attention output may provide relative interaction information as described above. In an aspect, attention outputs may be presented based on a multi-point scale providing relative indications of a need for a user's attention. Higher priority or lesser priority may be identified based on the points on a particular scale. A multipoint scale may be presented based on text such as a numeric indicator and/or may be graphical, based on a size or a length of the indicator corresponding to a priority ordering. Alternatively or additionally, a multi-point scale may be represented by an attribute of a presented captured image. For example a size of an image may indicate a priority. In another example, an image effect such as a level brightness may indicate a priority.

For example, a first attention output including an image of first object may be presented in black and white, based on interaction information for interaction including first PED 502a and first user 510a. A second attention output including an image of another object may be presented in full color or in gradations of red and white to direct first user's attention in a different manner. Numbers may be presented in and/or along with images to specify a priority and/or order for directing a user's attention to various objects as sources of input for the user. The size of the respective images may indicate a ranking or priority of one attention output over another. For example, if a first image is larger than a second image, the scale may be defined to indicate the user's attention should be directed away from the portable electronic device to receive input from a first object captured in the first image instead of and/or before directing attention to a second object captured in the second image.

A user interface element, including an attention output, may be presented by a library routine of, for example, GUI subsystem 417a. Attention director component 408a may change a user-detectable attribute of the UI element. Alternatively or additionally, attention director component 408a in second PED 502b may send attention information via network 506 to first PED 502a for presenting via an output device of first PED 502a. An attention output may include information for presenting a new user interface element and/or to change an attribute of an existing user interface element to alter and/or direct a user's attention to an object in motion relative to a portable electronic device.

A region of a surface in a portable electronic device may be designated for presenting an attention output. As described above a region of a surface of PED 602 may include a screen of a display device for presenting user interface elements illustrated in FIG. 6. A position on and/or in a surface of PED 602 may be defined for presenting an attention output. Attention outputs may have positions relative to one another. The relative positions may be defined to identify a direction, a level, and/or an object of attention based on their locations relative to one another. A portion of a screen in a display device may be configured for presenting one or more attention outputs.

An attention director component 408 in FIG. 4a and/or in FIG. 4b may provide attention information for an attention output that indicates how soon a user should direct attention away from a PED 502 to another source of input for the user. For example, changes in size, location, and/or color may indicate whether a particular object separate from the PED 502 requires attention and may give an indication of how soon an object may need attention and/or may indicate a level of attention suggested and/or required. A time indication for detecting sensory input from an object may give an actual time and/or a relative indication may be presented.

In FIG. 4b, attention director component 408b in attention service 403b may send attention information via a response to a request and/or via an asynchronous message to a client, such as first PED 502a and/or may exchange data with one or more input and/or output devices in one or both PEDs 502 directly and/or indirectly to send attention information including captured image data. Attention director component 408b may send attention information in a message via network 506 to a PED 502 for presenting an attention output.

Presentation subsystem 417a, in FIG. 4a, operating in a PED 502 may be operatively coupled to a projection device for projecting a user interface element as and/or including an attention output on a surface in a direction of an object from which a user of the PED 502 is directed to receive input; directing the user's attention away from the PED 502. An attention output may be included in and/or may include one or more of an audio interface element, a tactile interface element, a visual interface element, and an olfactory interface element.

Attention information may include time information identifying a duration for presenting an attention output to maintain the attention of a user directed to a particular object in motion relative to a portable electronic device. For example, a PED 502 may be performing an operation where no user interaction is required for a time period. An attention output may be presented by attention director component 408*a* for maintaining the attention of the user of PED 502 to one or more objects separate from the PED 502 based on the time period of no required interaction between the user and the PED 502

The method illustrated in FIG. 2 may include additional aspects supported by various adaptations and/or analogs of the arrangement of components in FIG. 3. For example, in various aspects, receiving object information and/or receiving interaction information may include receiving a message as a response to a request in a previously sent message as described above. In addition, as described above, receiving object information and/or receiving interaction information may include receiving a message transmitted asynchronously.

One or more of the elements of the method illustrated in FIG. 2 may be performed during specified times, such as after dark, identified by temporal information; based on an attribute, such as size, of an object in motion relative to a portable electronic device; based on a particular ambient condition, such as rain or snow that require a user be more attentive to objects other the portable electronic device; a user's experience in using a portable electronic device and/or a feature of the portable electronic device; a user's physical capabilities, mental capabilities, and/or a user's limitations may affect when one or more of the elements in the method are performed. One of more of the components illustrated in FIG. 3 may be adapted to operate in response to and/or otherwise based on information such as listed in this paragraph.

Object information and/or interaction information may be received in response to detecting one or more of a request to perform a particular operation, a performing of a particular operation, wherein the operation is to be performed and/or is being performed by the portable electronic device. One of more of the components illustrated in FIG. 3 may be adapted to monitor one or more of the items just listed and/or to interoperate with a component configured to monitor such items.

Detecting a user interaction with a portable electronic device may be based on one or more of a personal identification number (PIN), a hardware user identifier, an execution environment user identifier, an application user identifier, password, a digital signature that may be included in a digital certificate, a user communications address, a network address, device identifier, a manufacturer identifier, a serial number, a model number, an initiation operation, a removable data storage medium, temporal information, an ambient condition, geospatial information for the portable electronic device, the user, the portable electronic device, another user of another portable electronic device, a velocity of relative motion, an acceleration of relative motion, a topographic attribute of a route of relative motion, a count of objects in an areas including the portable electronic device, and a measure of sound. For example, a user interaction may be detected by an interaction monitor component 402, in FIG. 4*a* and/or in FIG. 4*b*, for a specific user or users, may be based on some or all of the types of information just identified.

Exemplary communication addresses include a phone identifier (e.g. a phone number), an email address, an instant message address, a short message service (SMS) address, a multi-media message service (MMS) address, an instant message address, a presence tuple identifier, and a video user communications address. A user communications address may be identified by an alias associated with the user communications address. For example, a user communications address may be located in an address book entry identified via an alias. An alias may be another user communications address for the user.

As described above, one or both of detecting a user interaction with a portable electronic device during a period of relative motion with respect to another object and sending attention information may be performed in response to interaction information detected by a sensor that may be integrated into a portable electronic device, such as a mobile phone and/or a media player. The sensor may detect one or more of an eyelid position, an eyelid movement, an eye position, an eye movement, a head position, a head movement, a substance generated by at least a portion of a body of the user, a measure of verbal activity, a substance taken in bodily by the user. For example, interaction information may be received based on input detected by sensor such as a breathalyzer device that may identify and/or that may be included in determining an attribute of visual interaction based on blood-alcohol information included in and/or identified by the interaction information.

Detecting a user interaction with a portable electronic device may include receiving a message, via a communications interface, identifying interaction information for the portable electronic device. The user interaction may be detected based on receiving the message. The message may be received by one or more of a PED 502 and a node that may or may not be another personal electronic device communicatively coupled to the PED 502. The message may be included in a communication between a first communicant represented by the PED and a second communicant represented by the other node.

Exemplary operations for which attention information may be sent, in response to, include one or more of presenting output to the user of a portable electronic device, receiving input from the user, receiving a message included in a communication including the user as a communicant, and sending a message included in a communication including the user a communicant.

One or more of detecting a user interaction with a portable electronic device and sending attention information may be performed in response to and/or otherwise based on one or more of an attribute of the user, an object in a location including the portable electronic device, an attribute of the portable electronic device, an attribute of an object in a location including the portable electronic device, a speed of relative motion, a path of relative motion, an ambient condition, a topographic attribute of a location including the portable electronic device, information from a sensor external to the portable electronic device, and information from a sensor included in the portable electronic device. For example, attention director 408*a* operating in first PED 502*a* may determine whether to send attention information based on a location of first PED 502*a*. The attention information may be sent based on a classification of the topography of the location.

Alternatively or additionally, attention information may be specified based on an identifier of an executable, a process, a thread, a hardware component identifier, a location in a data storage medium, a software component, a universal resource identifier (URI), a MIME type, an attribute of a user interaction included in performing the operation, a network address, a protocol, a communications interface, a content handler component, and a command line. An identifier of an attribute of a user interaction may be based on a type of user sensory activity. A user sensory activity may include at least one of visual activity, tactile activity, and auditory activity. In still another aspect, an identifier of an attribute of a user interaction may be identified based on an input device and/or an output device included in the user interaction.

The method illustrated in FIG. 2 may further include detecting an event defined for ending the presenting of the attention output. Additional attention information may be sent to stop the presenting of the attention output by the output device.

Detecting that a portable electronic device is in motion may include detecting a wind speed and/or a wind direction. In FIG. 5, first PED 502a may include and/or be communicatively coupled to an anemometer. A change in wind speed may be defined for first PED 502a to indicate a change in location indicating that first PED 502a is in motion. A change in wind speed may also indicate a change in direction of motion and/or a movement from inside a structure to outside.

Detecting that a portable electronic device is in motion may include detecting a difference between a first measure of pressure for a first portion of an external surface of the portable electronic device and a second measure of pressure for a second portion of an external surface of the portable electronic device. In an aspect, second PED 502b may include sensors on opposite surfaces. An increase in pressure detected by a pressure sensor in a first surface along with a decrease in pressure detected by a pressure sensor in an opposite second surface may indicate motion relative to the atmosphere. A motion monitor component 402 may be configured to detect motion based on differences in pressure detected by sensors in surfaces of second PED 502b.

Detecting that the portable electronic device is in motion may include receiving a message from another device identifying the motion. As described above, first PED 502a in FIG. 5 may send object information to second PED 502b for processing by a motion monitor component 402a in second PED 502b. The object information may identify that the two PEDs 502 are in motion and/or otherwise may be processed by motion monitor component 402a to determine whether the two PEDs 502 are in motion with respect to one another.

As described above, detecting interaction between a user and a portable electronic device may include detecting an input from the user of the portable electronic device. The input may be detected by at least one of a gaze detecting device, a tactile input detecting device, an audio input device, an image capture device, a motion detecting device, a light detecting, a heat detecting device, a chemical sensing device, a pressure sensing device, a speed sensing device, a direction sensing device, an acceleration detecting device, a weight sensing device, a mass sensing device, and a device for detecting measure based on a gravitational force.

An interaction may include at least one of receiving an input for sending data to a node via a network and receiving data, from the node, for presenting a user-detectable output by the portable electronic device. Sending the data and/or receiving the data may be performed via a communication that identifies the user of the portable electronic device as a communicant in the communication. The communication may include sending and/or receiving one or more of an email, a short message service message (SMS), a multimedia service message (MMS), an instance message, presence information, a voice message, and/or a video message.

Determining that an attention criterion is met may be performed in response to detecting a communication between a portable electronic device representing a user as a communicant identified in the communication and a node representing a second communicant in the communication.

Determining that an attention criterion is met may include, based on a detected input from the user, identifying the attention criterion and/or evaluating the attention criterion. An attention criterion may be based on one or more of a count of inputs, and a measure of time between detection of a first input and detection of a second input while the portable electronic device is in motion relative to another object.

An attention criterion may be based on one or more of a type of data and an amount of data at least one of received by the portable electronic device 502 in the interaction and output presented by the portable electronic device 502 in the interaction.

An attention criterion may be based on one or more of a measure of distance between a portable electronic device and another object, a measure of heat associated with the other object, a measure of size associated with the other object, a direction of motion, a measure of velocity of the relative motion, a measure of acceleration of the relative motion, a detected shape of the other object, an ability of the user, a disability of the user, a temporal attribute, an ambient condition, a topographic attribute of a location of the portable electronic device during motion, a location including the portable electronic object and the other object, a measure of sound, a measure of heat, a direction of the relative motion, a measure of interaction between the user and the portable electronic device, a measure of interaction of the user directed away from the portable electronic device, an attribute of the user, and an ambient condition.

An attention criterion may be received via a network and/or selected by the portable electronic device. For example, attention criterion may be included in and/or identified in information received based on a location by an attention condition component 406, such as a particular building, in which a PED 502 is present. The PED 502 may select one or more attention criterion for evaluating based on, for example, a type of portable electronic device, and/or based on an input from the user for selecting an attention criterion. Alternatively or additionally, an attention criterion may be based on an operation being performed by the PED 502 while in motion and/or based on an attribute of an object in motion relative to the PED 502.

An attention output may be defined to direct a user's attention away from a portable electronic device to an object in motion relative to the portable electronic device based on one or more of a location, a pattern, a color, a volume, a measure of brightness, and a duration of the presentation. An attention output may include a message including one or more of text data and voice data.

To the accomplishment of the foregoing and related ends, the descriptions and annexed drawings set forth certain illustrative aspects and implementations of the disclosure. These are indicative of but a few of the various ways in which one or more aspects of the disclosure may be employed. The other aspects, advantages, and novel features of the disclosure will become apparent from the detailed description included herein when considered in conjunction with the annexed drawings.

It should be understood that the various components illustrated in the various block diagrams represent logical components that are configured to perform the functionality described herein and may be implemented in software, hardware, or a combination of the two. Moreover, some or all of these logical components may be combined, some may be omitted altogether, and additional components may be added while still achieving the functionality described herein. Thus, the subject matter described herein may be embodied in many different variations, and all such variations are contemplated to be within the scope of what is claimed.

To facilitate an understanding of the subject matter described above, many aspects are described in terms of sequences of actions that may be performed by elements of a computer system. For example, it will be recognized that the various actions may be performed by specialized circuits or circuitry (e.g., discrete logic gates interconnected to perform a specialized function), by program instructions being executed by one or more instruction-processing units, or by a combination of both. The description herein of any sequence of actions is not intended to imply that the specific order described for performing that sequence must be followed.

Moreover, the methods described herein may be embodied in executable instructions stored in a computer-readable medium for use by or in connection with an instruction execution machine, system, apparatus, or device, such as a computer-based or processor-containing machine, system, apparatus, or device. As used here, a "computer-readable medium" may include one or more of any suitable media for storing the executable instructions of a computer program in one or more of an electronic, magnetic, optical, electromagnetic, and infrared form, such that the instruction execution machine, system, apparatus, or device may read (or fetch) the instructions from the computer-readable medium and execute the instructions for carrying out the described methods. A non-exhaustive list of conventional exemplary computer-readable media includes a portable computer diskette; a random access memory (RAM); a read only memory (ROM); an erasable programmable read only memory (EPROM or Flash memory); optical storage devices, including a portable compact disc (CD), a portable digital video disc (DVD), a high definition DVD (HD-DVD™), and a Blu-ray™ disc; and the like.

Thus, the subject matter described herein may be embodied in many different forms, and all such forms are contemplated to be within the scope of what is claimed. It will be understood that various details may be changed without departing from the scope of the claimed subject matter. Furthermore, the foregoing description is for the purpose of illustration only, and not for the purpose of limitation, as the scope of protection sought is defined by the claims as set forth hereinafter together with any equivalents.

All methods described herein may be performed in any order unless otherwise indicated herein explicitly or by context. The use of the terms "a" and "an" and "the" and similar referents in the context of the foregoing description and in the context of the following claims are to be construed to include the singular and the plural, unless otherwise indicated herein explicitly or clearly contradicted by context. The foregoing description is not to be interpreted as indicating that any non-claimed element is essential to the practice of the subject matter as claimed.

I claim:

1. A method, comprising:
   detecting a movement of a portable electronic device in a first direction, that results from a user walking with the portable electronic device in the first direction;
   receiving video data captured in a first direction by a video capture device during the movement, where a first object is in a second direction; and
   presenting a video by a display device of the portable electronic device that is viewable to the user for directing the user in a second direction towards the first object.

2. The method of claim 1 wherein information is integrated with the video, the information for directing an attention of the user to the first object.

3. The method of claim 1 wherein information is integrated with the video, the information for instructing the user to direct an attention to the first object.

4. The method of claim 1 wherein information is integrated with the video, the information indicating a location of the first object.

5. The method of claim 1 wherein information is integrated with the video, the information including directional information indicating directions to the first object.

6. The method of claim 1 wherein indicia is integrated with the video, the indicia including directional information indicating directions to the first object.

7. The method of claim 1 wherein indicia is integrated with the video, the indicia indicating directions to the first object, where a location of the indicia on the display device of the portable electronic device is based on a relative position between the first object and the portable electronic device.

8. The method of claim 1 wherein first indicia and second indicia are integrated with the video, the first indicia indicating directions to the first object, the second indicia indicating a distance to the first object.

9. The method of claim 8 wherein the first indicia and the second indicia are updated based on the movement of the device.

10. The method of claim 8 wherein the first indicia includes a direction indicator.

11. The method of claim 8 wherein the first indicia includes a label.

12. The method of claim 1 wherein tactile feedback is output simultaneously with the presentation the video, the tactile feedback being output based on a location of the first object.

13. The method of claim 1 wherein tactile feedback is output simultaneously with the presentation the video, the tactile feedback being output based on a movement of the portable electronic device.

14. The method of claim 1 wherein the video includes data reflecting a video capture of surroundings of the first object.

15. The method of claim 1 wherein the first object includes a location.

16. The method of claim 1 and further comprising:
    detecting a change in the movement of the portable electronic device;
    in response to detecting the change in the movement of the portable device, updating the presentation of the video by the display device of the portable electronic device.

17. The method of claim 1 wherein the video is conditionally presented by the display device of the portable electronic device, based on a detected position of the portable electronic device.

18. A portable electronic device, comprising:
- a display device;
- an input device;
- at least one non-transitory memory storing instructions; and
- one or more processors in communication with the display device, the input device, and the at least one non-transitory memory, wherein the one or more processors execute the instructions to cause the portable electronic device to:
  - detect a movement of the portable electronic device in a first direction, that results from a user walking with the portable electronic device in the first direction;
  - receive video data captured in a first direction by a video capture device during the movement, where a first object is in a second direction; and
  - present a video by the display device of the portable electronic device that is viewable to the user for directing the user in a second direction towards the first object.

19. A non-transitory computer-readable media storing computer instructions that, when executed by one or more processors of a portable electronic device, cause the portable electronic device to:
- detect movement of the portable electronic device in a first direction, that results from a user walking with the portable electronic device in the first direction;
- receive video data captured in a first direction by a video capture device during the movement, where a first object is in a second direction; and
- present a video by a display device of the portable electronic device that is viewable to the user for directing the user in a second direction towards the first object.

20. The method of claim 1 wherein the user is directed in the second direction towards the first object which is not initially presented in the video, so that the user is directed to walk in the second direction for directing an attention of the user to the first object.

21. The method of claim 1 and further comprising: detecting additional movement of the portable electronic device in the second direction, that results from the user walking with the portable electronic device in the second direction; receiving additional video data, that includes the first object, captured by the video capture device during the additional movement of the portable electronic device in the second direction; and utilizing the additional video data, presenting additional video by the display device of the portable electronic device that is viewable to the user for directing an attention of the user in connection with the first object that is presented in the additional video.

22. The method of claim 1 wherein information is integrated with the video, the information being received via a data store including location information for objects with fixed locations.

* * * * *